United States Patent [19]

Sakaue et al.

[11] Patent Number: 5,168,550
[45] Date of Patent: Dec. 1, 1992

[54] NEUTRAL NETWORK WITH PLURAL WEIGHT CALCULATION METHODS AND VARIATION OF PLURAL LEARNING PARAMETERS

[75] Inventors: Shigeo Sakaue, Takarazuka; Toshiyuki Kohda, Takatsuki; Yasuharu Shimeki, Suita; Hideyuki Takagi, Kyoto; Hayato Togawa, Tokyo, all of Japan

[73] Assignee: Matsushita Electric Industrial Co., Ltd., Osaka, Japan

[21] Appl. No.: 481,330

[22] Filed: Feb. 20, 1990

[30] Foreign Application Priority Data

Feb. 23, 1989 [JP] Japan .................................. 1-43730
Feb. 28, 1989 [JP] Japan .................................. 1-47610

[51] Int. Cl.⁵ .............................................. G06F 15/18
[52] U.S. Cl. .................................................... 395/23
[58] Field of Search ........................... 364/513; 395/23

[56] References Cited

PUBLICATIONS

Improving the Learning Rate of Back-Propagation with the Gradient Reuse Algorithm; Hush et al; IEEE Inter. Conf. on Neutral Networks; Jul. 24–27, 1988; pp. 1–441 to 1–446.
Learning Internal Representations by Error Propagation; Rumelhart et al.; Parallel Distributed Processing, vol. 1, Foundations; MIT Press; 1986; pp. 318–362.
"Learning representations by back-propagating errors", David Rumelhart et al.; Nature, vol. 323, Oct. 1986, pp. 533–536.
DUTTA, "Bond Ratings: A non-conservative application of neutral networks", IEEE International Conference on Neutral Networks, vol. 2, pp. 443–450, Jul. 24, 1988.
Watrous, "Learning algorithms for connectionist networks: applied gradient methods of nonlinear optimization", IEEE First National Conference on Neutral Networks, vol. 2, pp. 619–628, Jun. 21, 1987.
JACOBS, "Increased rates of convergence through learning rate adaption", Neutral Networks, vol. 1, No. 4, pp. 295–307, 1988.

Primary Examiner—Allen R. MacDonald
Attorney, Agent, or Firm—Stevens, Davis, Miller & Mosher

[57] ABSTRACT

An iterative learning machine uses, as a direction of changing iterative weight, a conjugate gradient direction in place of the conventional steepest descent direction, thereby saving time. Learning rates are set dynamically. Error calculation for plural learning rates, with respect to a certain weight changing direction, are accomplished by storing a product-sum of the input signals and weights in a hidden layer and a product-sum of the input signals and the weight changing direction in the hidden layer. When the learning falls into a non-effective state where further iteration does not effectively reduce an error, the weights are adjusted in order to restart the learning.

31 Claims, 17 Drawing Sheets $y[j] = fnc(net[j])$
$= fnc(\sum_i (w[i,j] * y[i]))$

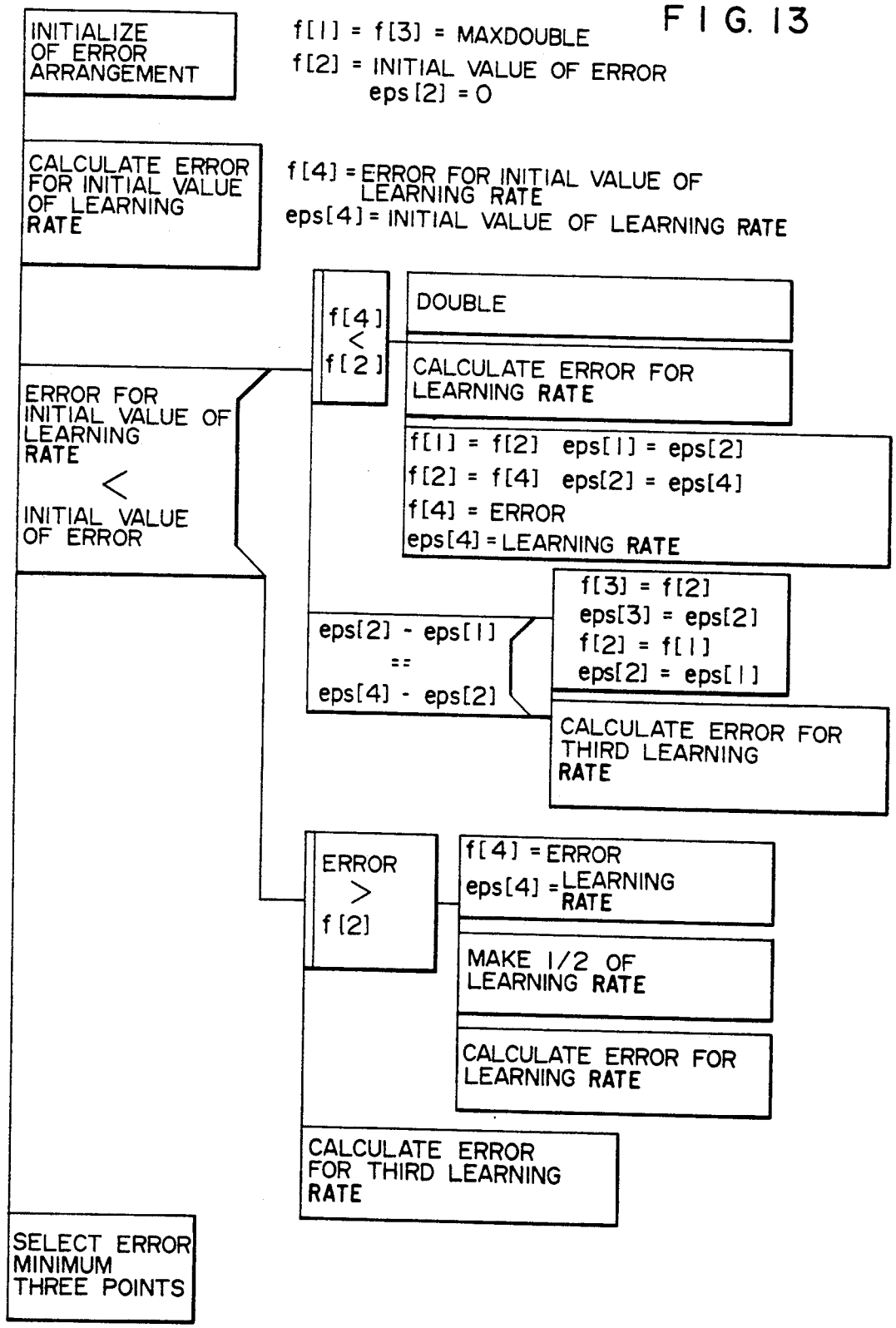
F I G. 13

NEUTRAL NETWORK WITH PLURAL WEIGHT CALCULATION METHODS AND VARIATION OF PLURAL LEARNING PARAMETERS

BACKGROUND OF THE INVENTION

The present invention relates to a learning machine for data processing with multi-input single-output circuits connected in a hierarchical structure.

An example of the conventional learning machine with multi-input single-output circuits connected in a hierarchical structure is disclosed in e.g. D.E. Rummelhart et al. "Learning representations by back-propagating errors", Nature Vol. 323 No. 9 (1986). In the conventional learning machine with multi-input single-output circuits connected in a hierarchical structure, each multi-input single-output circuit adds up input signals weighted,. and subjects the resulting signal to a conversion scheme having a saturation characteristic; the output signal thus provided is expressed by $$y[j] = \text{fnc}\left(\sum_i (w[i,j] * y[i])\right) \quad (1)$$

where $y[j]$ is an output signal from a j-the multi-input single-output circuit, $y[i]$ is an output signal from an i-th multi-input single-output circuit in a previous layer, and $w[i,j]$ is the weight charged on the output signal from the i-th multi-input single-output circuit in the previous layer when it is supplied to the j-th multi-input single-output circuit. fnc( ) is a function having a saturation characteristic which can be expressed by e.g. a sigmoidal function $$\text{fnc}(x) = \frac{2}{1 + \exp(-x)} - 1$$

A learning machine is usually structured in such a manner that multi-input single-output circuits are connected in a hierarchical structure and learns to provide a desired output signal (hereinafter referred to as a supervising signal) in response to input signals. In the learning, an error E is acquired from the supervising signal and the actual output signal in accordance with Equation (2)

$$\begin{aligned} E &= 0.5 * \sum_p \sum_j (t_p[j] - y_p[j])^2 \\ &= E(w) \end{aligned} \quad (2)$$

where $y_p>[j]$ is an output signal from a j-th multi-input single-output circuit in an output layer for a p-th input pattern, $t_p[j]$ is a supervising signal for $Y_p[j]$, $\Sigma_p$ is a sum for all the input patterns, $\Sigma_j$ is a sum for all the output signals in the output layer, and w is a vector including weight $w[i,j]$ as a component (hereinafter referred to as a weight vector).

As shown in Equation (2), the error E can be expressed as a squared sum of a difference between a supervising signal and an actual output signal and so is a function of the weight vector w. A purpose of learning is to change the weight vector to minimize the difference between the supervising signal and the actual output signal, i.e. the error E. The amount of changing the weight vector is decided by $$\Delta \vec{w} = -\epsilon \cdot \frac{\partial E}{\partial W} - \alpha \cdot \Delta \vec{w} \quad (3)$$

where $\epsilon$ is a positive constant referred to as a learning rate, $\alpha$ is a positive constant referred to as an accelerating parameter, $\partial E/\partial W$ is a vector including as a component the differentiation of the error expressed by Equation (2) by the weight $w[i,j]$, which is referred to as the steepest descent direction, and w is a vector representation of the weight changing amount in the previous learning. Such a learning algorithm is generally referred to as an error back-propagation method.

In the learning of the conventional learning machine with multi-input single-output circuits connected in a hierarchical structure, the learning rate $\epsilon$ and the accelerating parameter $\alpha$ are fixed; they are decided through experience or trial and error and so are not necessarily optimum values. This lengthens the time required for learning. Moreover, the back-propagation method based on the steepest descent method, used for minimizing the error which is the purpose of learning, is not always optimum. Further, the learning may possibly be fallen into a non-effective state where further learning does not reduce any error.

SUMMARY OF THE INVENTION

In view of the problems mentioned above, one of the objects of the present invention is to provide a learning machine with multi-input single-output circuits connected in a hierarchical structure which can shorten the time required for learning by using, as a method of minimizing an error between supervising signals (desired output signals and actual output signals, a conjugate gradient method which is considerably improved over the steepest descent method.

Another object of the present invention is to provide a learning machine with multi-input single-output circuits connected in a hierarchical structure which can shorten the time required for learning by advancing the learning with the optimum value of a learning rate being dynamically set.

A further object of the present invention is to provide a learning machine with multi-input single-output circuits connected in a hierarchical structure which can shorten the time required for learning by reducing the amount of operation in calculating errors for plural learning rates relative to a predetermined wight changing direction.

Yet another object of the present invention is to provide a learning machine with multi-input single output circuits connected in a hierarchical structure which can shorten the time required for learning by readjusting the weight to restart the learning when detecting that the learning has been fallen into a non-effective state such that further iterations do not reduce the error.

In accordance with the present invention, a learning machine is provided with multi-input single-output circuits connected in a hierarchical structure comprising hidden layers including plural multi-input single-output circuits which subject a weighted sum of input signals to a non-linear processing by a characteristic function having a saturation characteristic to provide output signals; an output layer includes of plural multi-input single-output circuits which subjects a weighted sum of the output signals from the hidden layers to a non-linear processing by a characteristic function having a saturation characteristic to provide output signals; a supervising signal generating unit generates desired output signals for said output layer, a weight changing direction deciding unit selects and decides, from plural directions, the weight changing direction for minimizing errors between outputs from the supervising signal generating unit and outputs from the output layer; a line searching unit produces weight changing amounts for plural learning rates with respect to the weight changing direction; a weight changing unit selects weight changing amounts from the weight changing amounts acquired by said line searching unit, a hidden layer product-sum storage unit stores a product sum of input signals and weight of the hidden layer and a product sum of the input signals and the direction of changing the weight of the hidden layer; and a non-effective learning state detecting unit detects when the learning has fallen into a unsuitable state where further iterations do not effectively reduce the error.

By means of this construction, the present invention subjects the weighted sum of input signals to a non-linear processing to provide an output signal in both hidden layers and output layer; in order to minimize an error between a desired output signal generated by the supervising signal generating unit and an actual output signal, the invention selects and decides the weight changing direction from the plurality of directions in the weight changing deciding unit; the weight changing amounts for plural learning rates are acquired in the line searching unit; then, on the basis of the product sum of the input signals and the weight in the hidden layer and the product sum of the input signals and the direction of changing the weight in the hidden layer (stored in the hidden layer product sum storage unit), acquires, with less processing than the conventional device, an output from the hidden layer for the weight changing amount set in the line searching unit; and finally, checking in the non-effective learning state detecting unit if the learning has been fallen into a non-effective state or not, selects, in the weight changing unit, the weight changing amounts required by the line searching unit.

Thereafter, in the same manner, the operation of changing weights is repeated, using a learning rate of minimum error in a weight changing direction thereby reducing the error. In this manner, when the weight changing direction is decided, an optimum learning rate is dynamically set in that direction, and the weights are changed using this optimum learning rate to reduce errors in a short time.

In the present invention, in order to minimize error, the weight changing direction is decided by the above weight changing direction deciding unit. Regarding the weight changing direction, the steepest descent direction is "locally" the most effective direction in that the greatest amount of reducing the error can be given with the smallest amount of changing the weight in the neighborhood of the present weight value. On the other hand, a conjugate gradient direction is "globally" the most effective direction in that the weight is changed in a different direction from the weight changing in the previous learning.

The present invention, by storing, in the hidden layer product sum storage unit, the product sum of the input signals and the weights in the hidden layer, and the sum of the input signals and the direction of changing the weight in the hidden layer, greatly reduces the amount of time acquiring the outputs from the hidden layer in calculating the errors for plural learning rates when the weight changing direction is fixed, thereby shortening the time required for learning.

The present invention, when the non-effective learning state detecting unit detects that changing the weight toward the steepest descent conjugate gradient direction cannot reduce an error, decides that the learning has been fallen into the non-effective state and readjusts the weight to restart the learning accordingly, thereby preventing stalling or wasted processing time.

BRIEF DESCRIPTION OF THE DRAWINGS

FIG. 13 is a PAD (Problem Analysis Diagram) showing the operation of the line searching unit in the embodiment of FIG. 9;

DESCRIPTION OF THE PREFERRED EMBODIMENTS

Prior to explaining several embodiments of the present invention, the conventional learning machine with multi-input single-output circuits connected in a hierarchical structure will be further explained with reference to FIGS. 1 to 5.

Figure 1:
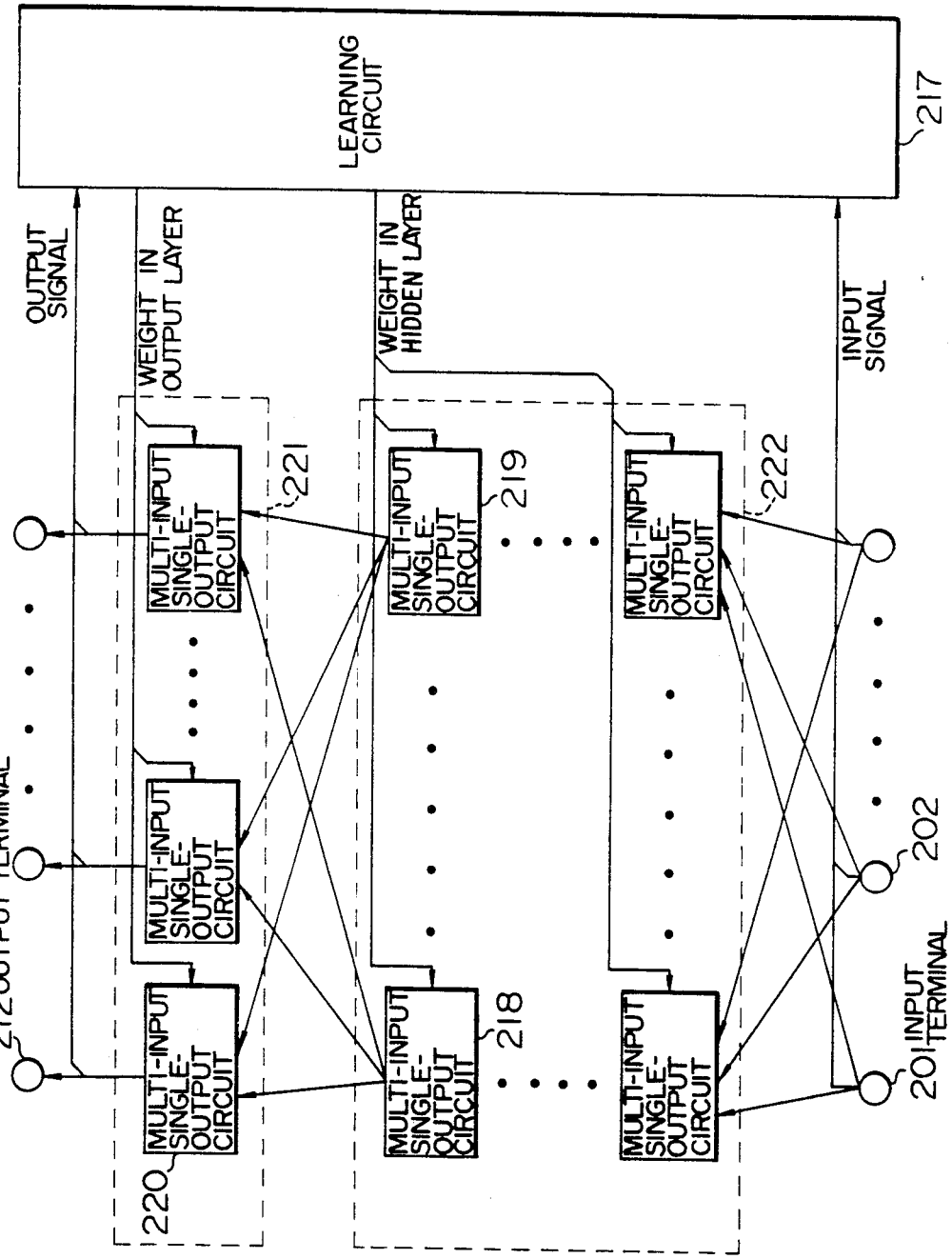
FIG. 1 is a block diagram showing the general arrangement of the conventional learning machine with multi-input single-output, circuits connected in a hierarchical structure.

FIG. 1 shows the general arrangement of the conventional learning machine with multi-input single-output circuits connected in a hierarchical structure. In FIG. 1, 201 and 202 are input terminals; 212 is an output terminal; 217 is a learning circuit; 218, 219 and 220 are multi-input single-output circuits; 221 is an output layer; and 222 denotes hidden layers. As seen from FIG. 1, the learning machine, through the construction in which multi-input single-output circuits are connected in a hierarchical structure, process input from input terminals 201, 202 and to provide output signals at the output terminals. Among the multi-input single-output terminal circuits, the layer consisting of the multi-input single-output circuits generating the output signals is referred to as the output layer, and the layers consisting of the other multi-input single-output circuits are referred to as the hidden layers. The hidden layers may be a single layer of the multi-input single-output circuits or plural layers thereof.

Figure 2:
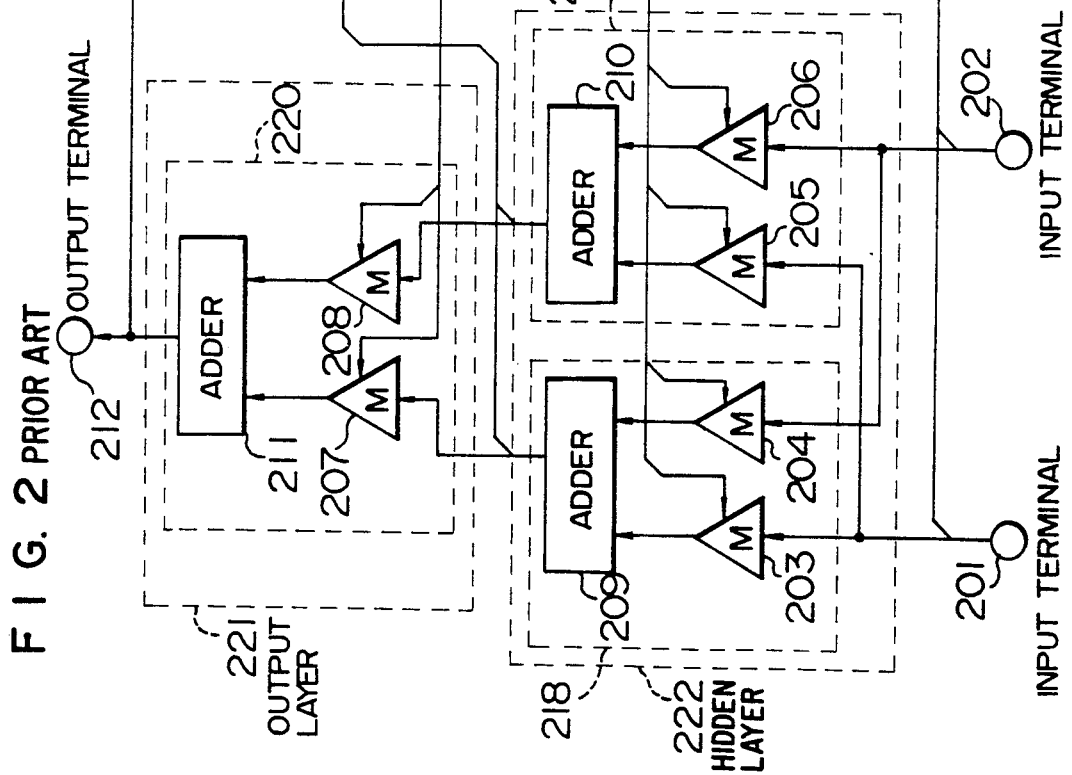
FIG. 2 is a block diagram showing the detailed arrangement of the conventional learning machine with multi-input single-output circuits connected in a hierarchical structure.
Figure 3:
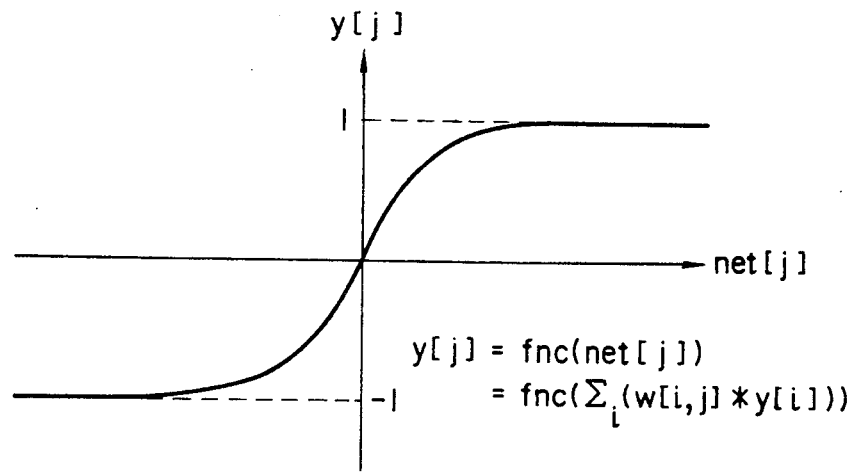
FIG. 3 is a graph of the characteristic function of an adder having a saturation input/output characteristic in the conventional learning machine of FIG. 2.

FIG. 2 shows the detailed arrangement of the conventional learning machine with multi-input single-output circuits connected in a hierarchical structure. In FIG. 2, 203, 204, 205, 206, 207 and 208 are variable weight multipliers; 209, 210 and 211 are adders having a saturation input/output characteristic; 212 is an output terminal; 213 is a supervising signal generating unit; 214 is an error calculating unit; 215 is the steepest descent direction decision unit; and 216 is a weight changing unit. In comparison with the general arrangement of the learning machine of FIG. 1, the learning machine shown in FIG. 2 comprises the output layer consisting of one multi-input single-output circuit and the hidden layer of one layer consisting of two multi-input single-output circuits. As seen form FIG. 2, each multi-input single-output consists of two variable weight multipliers and one adder. Thus, the learning machine is constructed so that plural multi-input single=output circuits are connected in a hierarchical structure. FIG. 3 is a graph of the characteristic function of the adders 209, 210 and 211 having a saturation input/output characteristic. The adders 209, 210 and 211 have the saturation input/output characteristic shown in FIG. 3.

Figure 4:
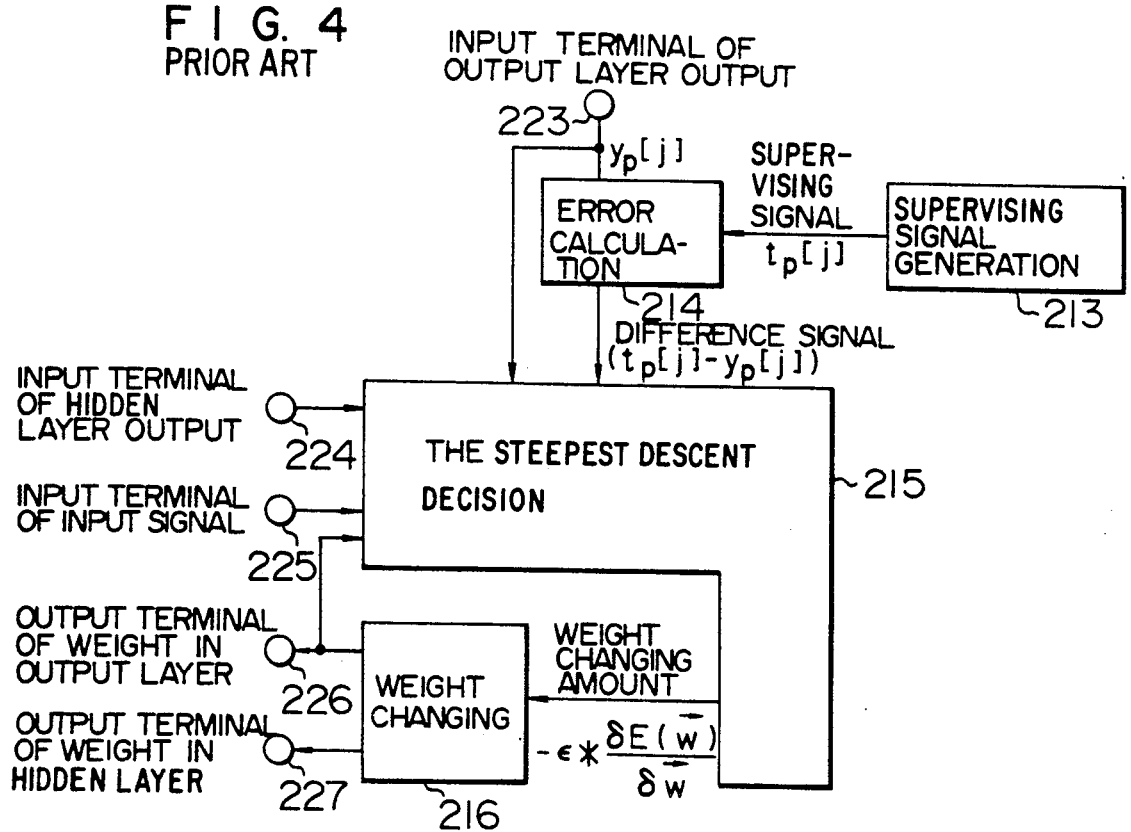
FIG. 4 is a block diagram showing the arrangement of a learning circuit in the conventional learning machine with multi-input single-output circuits connected in a hierarchical structure.

The conventional learning machine with multi-input single-output circuits connected in a hierarchical structure, in order to provide a desired output signal for input signals, changes the weight applied to the input signals by the variable weight multiplier. FIG. 4 shows the arrangement of the learning circuit 217 of this conventional learning machine. In FIG. 4, 223 is an input terminal of the output from the output layer; 224 is an input terminal of the output from the hidden layer; 225 is an input terminal of the input signals; 226 is an output terminal of the weight in the output layer; and 227 is an output terminal of the weight in the hidden layer. In the conventional multi-input single-output circuits connected in a hierarchical structure, the supervising signal generating unit 213 generates a supervising signal (desired output signal) $t_p[j]$ for the input signals. The error calculating unit 214 calculates an error E expressed by Equation 2 from the supervising signal $t_p[j]$ and an actual output signal $y_p[j]$. The error calculating unit sends a difference signal between the supervising signal and the output signal $t_p[j] - y_p[j]$, which si required to change the weight, to the steepest descent direction decision unit 215. On the basis of the above difference signal, the output signal from the output layer, the output signals from the hidden layer, the input signals and the weights in the output layer, the steepest descent direction of the error E in a weight space where the weights are expressed in vector. The steepest descent direction can be expressed by $$\vec{g} = -\frac{\partial E \vec{\mu}}{\partial \vec{\mu}} \quad (4)$$

The right side of Equation (4) is a vector expression of the differentiation of the error E by weights. The steepest descent direction decision unit 215 multiplies the steepest descent direction by a learning rate to provide an output to the weight changing unit 216. The weight changing unit 216 acquires the weight changing amount from Equation (3) and changes the weight to be multiplied in the respective variable weight multipliers 203, 204, 205, 206, 207 and 208. In this way, the operation of acquiring the weight changing amount is repeated by the steepest descent method to gradually reduce the error. When the error has been sufficiently decreased, decision that the output signal has approached the desired value is made to complete the learning.

Figure 5:
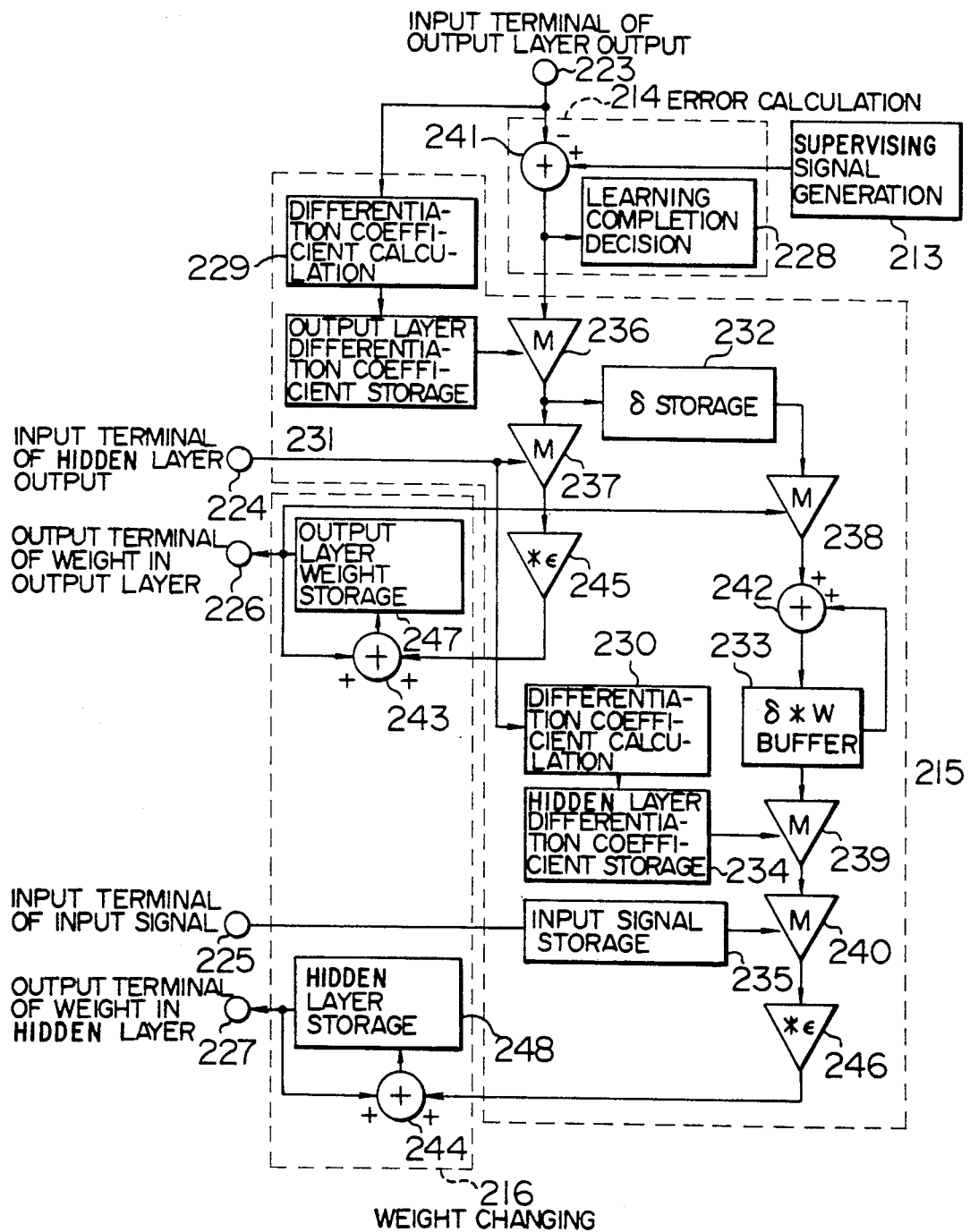
FIG. 5 is a block diagram showing the details of the learning circuit of FIG. 4.

FIG. 5 shows the details of the learning circuit 217 in the conventional learning machine with multi-input single-output circuits connected in a hierarchical structure. In FIG. 5, 228 is a learning completion decision unit; 229 and 230 are differentiation coefficient calculation units; 231 is an output differentiation coefficient storage unit; 232 is a $\delta$ storage unit; 233 is a $\delta^*$ w buffer; 234 is a hidden layer differentiation coefficient storage unit; 235 is an input signal storage unit; 236, 237, 238, 239 and 240 are multipliers; 241, 242, and 244 are adders; 245 and 246 are learning rate multipliers; 247 is an output layer weight storage unit; and 248 is a hidden layer weight storage unit.

Referring to FIG. 5, the operation of the learning circuit will be explained. The weight changing amount supplied from the steepest descent direction decision unit 215 can be expressed by $$\Delta w_g[i, j] = -\epsilon * \frac{\delta E}{\delta w[i, j]} \quad (5)$$

where $w[i,j]$ is the weight to be multiplied by the output signal from an i-the multi-input single-output circuit in the previous layer, which is supplied to a j-the multi-input single-output circuit, $\Delta w_g[i,j]$ is the weight changing amount of $w[i,j]$ relative to the steepest descent direction, and $\epsilon$ is a learning rate. Equation (5) can be transformed into $$\Delta w_g[i, j] = -\epsilon * \sum_p \left( \frac{\delta E}{\delta net_p[j]} * \frac{\delta net_p[j]}{\delta w[i, j]} \right) \quad (6)$$

where $net_p[i] = \Sigma_i(w[i,j] * y_p[i])$, and $y_p[i]$ is an output signal from an i-the multi-input single-output circuit in the previous layer corresponding to the p-the input signals. Equation (6) can be further transformed into $$\Delta w_g[i,j] = \epsilon_p * \Sigma (\delta w_p[j] * y_p[i]) \quad (7)$$

where $$\delta w_p[j] = - \frac{\delta E}{\delta net_p[j]} \quad (8)$$

The manner of transforming the equation depends on whether the j-the multi-input single-output circuit resides in the output layer or the hidden layer. * When the j-th multi-input single-output circuit resides in the output layer, $$\delta w_p[j] = - \frac{\delta E}{\delta net_p[j]}$$
$$= - \frac{\delta E}{\delta y_p[j]} * \frac{\delta fnc(net_p[j])}{\delta net_p[j]}$$

where $fnc(net_p[j])$ is a characteristic function ($=y_p[j]$) of each multi-input single-output circuit in the output layer. Using Equation (2), this equation can be further transformed into $$\delta w_p[j] = (t_p[j] - y_p[j]) * \frac{\delta fnc(net_p[j])}{\delta net_p[j]}$$

Consequently, it can be expressed by $$\Delta w_g[i,j] = \epsilon * \Sigma \left( \left( t_p[j] - y_p[j] \right) * \frac{\delta fnc(net_p[j])}{\delta net_p[j]} * y_p[i] \right) \quad (9)$$

In FIG. 5, the adder 241 calculates $(t_p[j]-y_p[j])$ in Equation (9), the differentiation coefficient unit 229 calculates $\delta fnc(net_p[j])/\delta net_p[j]$, and the multiplier 236 calculates $(t_p[j]-y_p[j]) * \delta fnc(net_p[j])/\delta net_p[j]$, through the output layer differentiation coefficient storage unit 231. This value, which is $\delta w_p[j]$, is stored in the δ storage unit 232. The multiplier 237 calculates a product of $\delta w_p[j]$ and the hidden layer output $y_p[i]$. the multiplier 245 multiplies this product by a learning rate Δ to provide $\Delta w_g[i,j]$ expressed by Equation (9), αtimes of the weight changing amount in the previous learning is added to $\Delta w_g[i,j]$ of Equation (9) to provide the weight changing amount $\Delta w[i,j]$ expressed by Equation (3). The adder 243 calculates a sum of this weight changing amount and the weight before change thereby changing the weight in the output layer stored in the output layer weight storage unit 247.

*When the j-th multi-input single-output circuit resides in the hidden layer, $$\delta w_p[j] = - \frac{\delta E}{\delta net_p[j]}$$
$$= - \frac{\delta fnc(net_p[j])}{\delta net_p[j]} * \left( - \frac{\delta E}{\delta fnc(net_p[j])} \right)$$
$$= - \frac{\delta fnc(net_p[j])}{\delta net_p[j]} * \Sigma \left( - \frac{\delta E}{\delta net_p[k]} * \frac{\delta net_p[k]}{\delta y_p[j]} \right)$$

where $net_p[k] = \Sigma(w[j,k]*y_p[j])$, and $w[j,k]$ is a weight to be multiplied by the output $y_p[j]$ of the j-th multi-input single-output circuit in the next layer. Using Equation (8), this equation can be further transformed into $$\delta w_p[j] = \frac{\delta fnc(net_p[j])}{\delta net_p[j]} * \Sigma_k (\delta w_p[k] * w[j,k])$$

Consequently, it can be expressed by $$\Delta w_g[i,j] = \epsilon * \Sigma_p \left\{ \frac{\delta fnc(net_p[j])}{\delta net_p[j]} * \Sigma_k (\delta w_p[k] * w[j,k]) * y_p[i] \right\} \quad (10)$$

In FIG. 5, the multiplier 238 calculates a product of the an output $\delta w_p[k]$ from the δstorage unit 232 and the weight $w[j,k]$ in the output layer, and the δ* w buffer 233 and the adder 242 calculates $$\Sigma_k (\delta w_p[k] * w[j,k]).$$

The differentiation coefficient $\delta fnc(net_p[j])/\delta net_p[j]$, is supplied to the multiplier 239 through the hidden layer differentiation coefficient storage unit 234, which calculates a product of this coefficient and the above $$\Sigma_k (\delta w_p[k] * w[j,k]).$$

The multiplier 240 multiplies this product by the input signal $y_p[i]$. The multiplier 246 multiplies this product by a learning rate $\epsilon$ to provide $\Delta w_g[i,j]$ expressed by Equation (10). αtimes of the weight changing amount in the previous learning is added to $\Delta w_g[i,j]$ of Equation (10) to provide the weight changing amount $\Delta w[i,j]$ expressed by Equation (3). The adder 244 calculates a sum of this weight changing the weight storage unit 248.

In this way, in order to reduce the error between the output signals from the output layer and supervising signal, the amount of changing the weight in the output layer is acquired using difference signals between the output signals and the supervising signal and the weight changing amount is successively acquired form the output side towards the input side. Such a learning algorithm is referred to as a back-propagation method.

Figure 6:
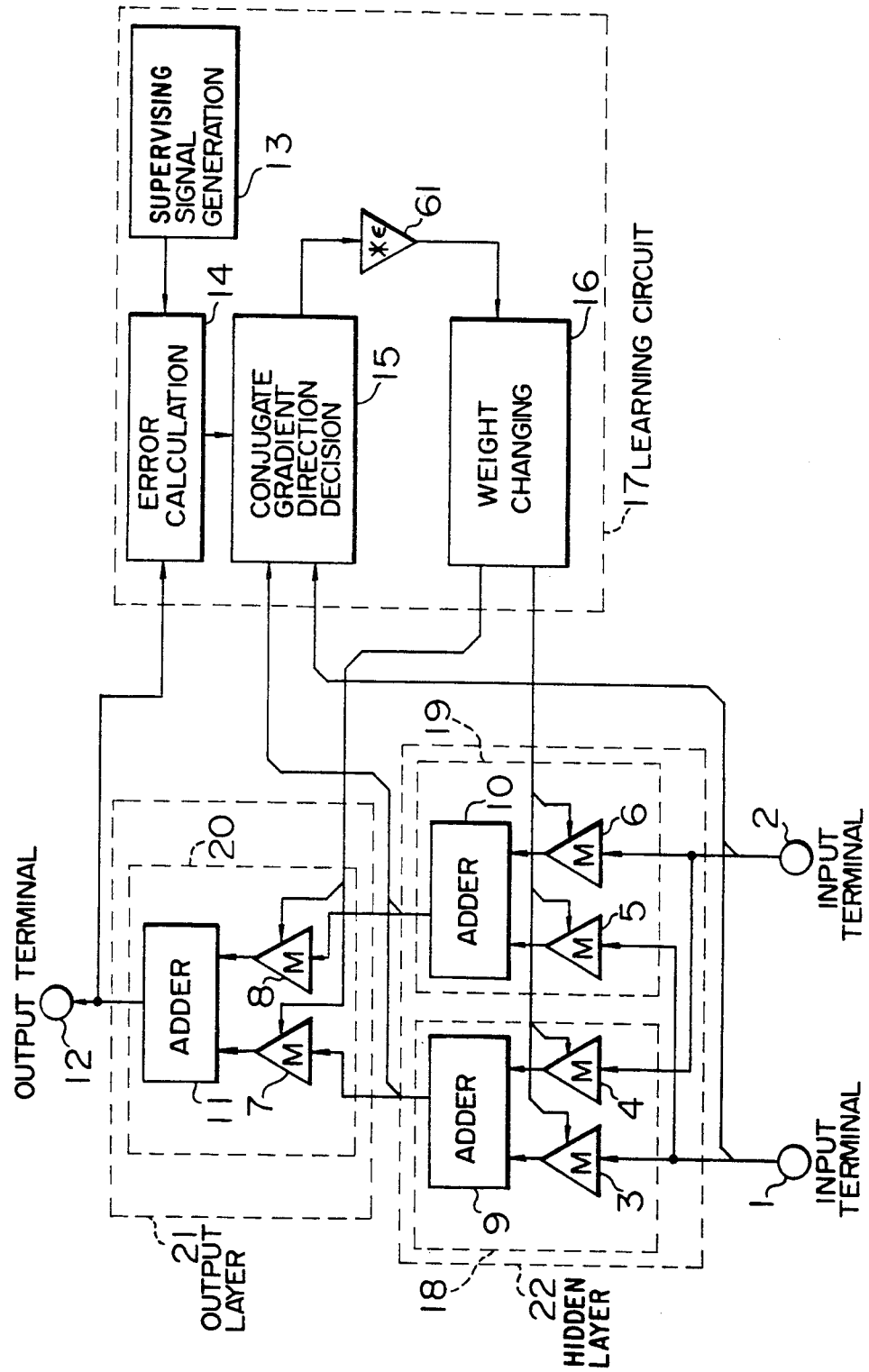
FIG. 6 is a block diagram showing the learning machine with multi-input single-output circuits connected in a hierarchical structure according to the first embodiment of the present invention.

In the conventional learning machine having the construction described above, the learning rate $\epsilon$ and the accelerating parameter $\epsilon$ are fixed; they are decided through experience or trial and error and so are not always optimum values. This lengthens the time required for learning. Moreover, the weight changing direction using the differentiation of the error E by the weights (i.e. the steepest descent direction) is not always optimum. Further, the learning may possibly fall into a non-effective state where further learning does not reduce any error. FIG. 6 shows the arrangement of a learning machine with multi-input single-output circuits connected in a hierarchical structure according to a first embodiment of the present invention. In FIG. 6, 1 and 2 are input terminals; 3, 4, 5, 6, 7 and 8 are variable weight multipliers; 9, 10 and 11 are adders having a saturation input/output characteristic; 12 is an output terminal; 13 is a supervising signal generating unit; 14 is an error calculating unit; 15 is a conjugate gradient direction decision unit; 18 is a weight changing unit; 17 is a learning circuit; 18, 19 and 20 are multi-input single-output circuits; 21 is an output layer; 22 is a hidden layer; and 61 is a learning rate multiplier.

In the learning machine according to this embodiment, multi-input single-output circuits are connected in a hierarchical structure; each circuit consists of variable weight multipliers and an adder having a saturation input-output characteristic. Each multi-input single-output circuit adds up input signals. after having been weighted. and subjects the sum to a non-linear processing to provide an output signal. In the learning of the learning machine according to this embodiment, in order that an output from the output layer 21 is equal to an output from the supervising signal generating unit 13, the weight to be multiplied in the multipliers 3, 4, 5, 6, 7 and 8 are changed. If the vectors having weights as components are referred to as weight vectors, the amount of changing the weight vectors can also be expresses in vector form. The direction of this weight changing vector is referred to as a weight changing direction. In this embodiment, a conjugate gradient direction is used as the weight changing direction. The conjugate gradient direction is given by $$\vec{d} = \vec{g} + \beta * \vec{d'} \quad (11)$$

where g is the steepest descent direction expressed by Equation (4), and B is a constant expressed by $$\beta = \frac{\|g\|^2}{\|g'\|^2} \quad (12)$$

d' is a conjugate gradient direction in the previous learning, and $\|g\rightarrow''\|$ is the norm of the vector in the steepest descent direction g→' in the previous learning. Incidentally, the weight changing direction in an initial learning is defined as the steepest descent direction.

Figure 7:
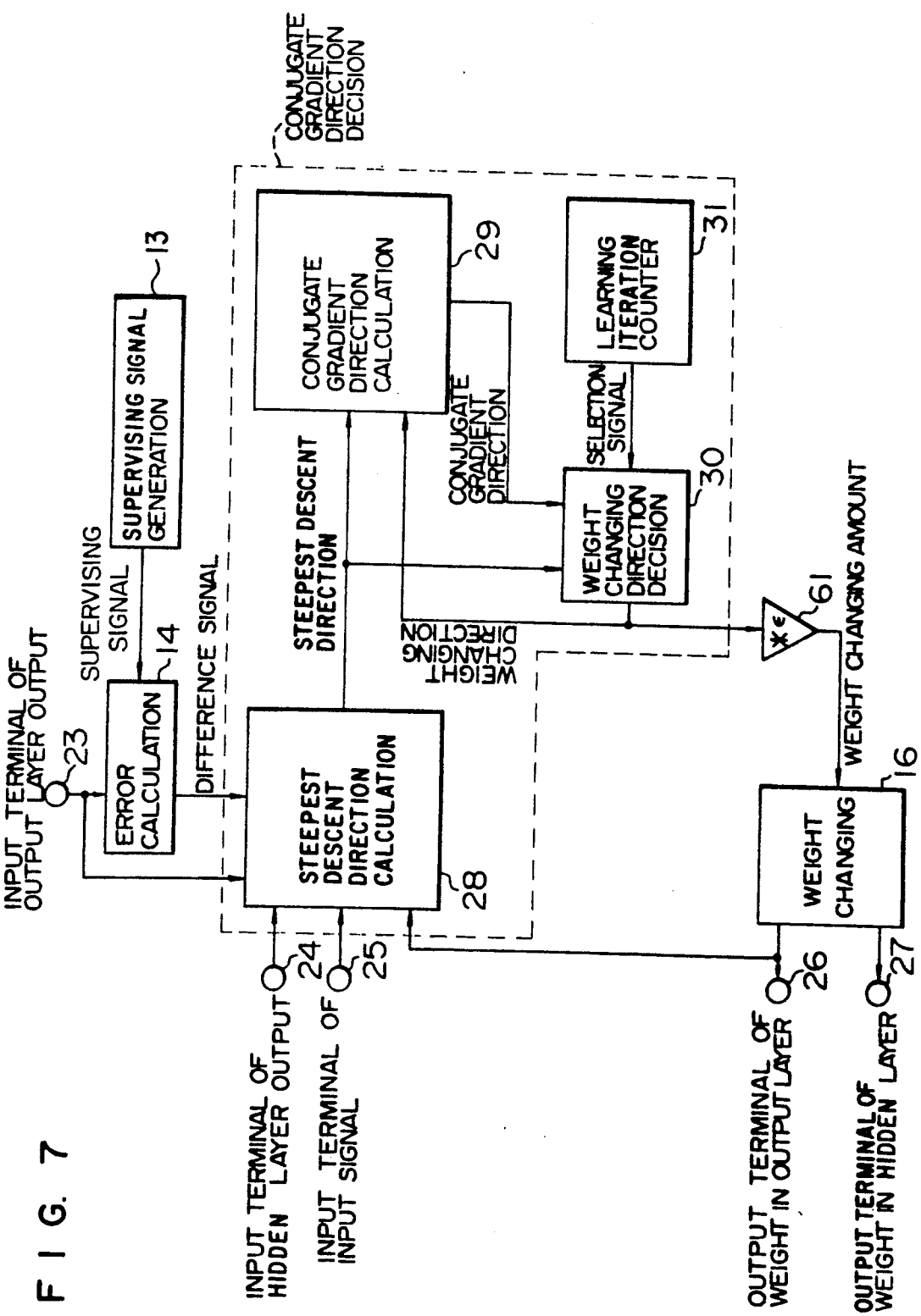
FIG. 7 is a block diagram showing the arrangement of the learning circuit in the embodiment of FIG. 6.

FIG. 7 shows an arrangement of the learning circuit 17. In FIG. 7, 23 is an input terminal of the output from the output layer; 24 is an input terminal of the output from the hidden layer; 25 is an input terminal of the input signals; 26 is an output terminal of the weight of the output layer; 27 is an output terminal of the weight of the hidden layer; 28 is the steepest descent calculation unit; 29 is a conjugate gradient direction calculation unit; 30 is a weight changing direction decision unit; and 31 is a learning iteration counting unit.

Now referring to FIG. 7, explanation will be given for the operation of learning circuit 17 in the learning machine with multi-input single-output circuits connected in a hierarchical structure. The supervising signal generating unit 13 provides a desired signal for the input signals as a supervising signal to the error calculation unit 14 which produces a difference signal between the supervising signal and an actual output signal. The conjugate gradient direction decision unit 15 acquires the weight changing direction from the difference signal. Further, the weight changing unit 16 changes the weight in accordance with the weight changing amount acquired by the learning rate multiplier 61. The conjugate gradient direction decision unit 15 acquires the weight changing direction in the following manner. The steepest descent direction calculation unit 28, on the basis of the difference signal provided from the error calculation unit 14, the output signal from the output layer, the input signal and the weight of the output layer, acquires the steepest descent direction expressed by Equation (4). The conjugate gradient direction calculation unit 29 acquires a conjugate gradient direction from the steepest descent and the weight changing direction in the previous learning. The learning iteration counting unit 31 counts the iteration of learning to provide a selection signal of which the steepest descent and the conjugate gradient direction is to be used as a weight changing direction.

Generally, in the conjugate gradient method. using the steepest descent for the learning iteration for each weight accelerates the convergence of the error. Therefore, as before, the learning iteration counting unit 31 produces the selection signal so that the steepest descent direction is used for the learning iteration every number of the weights. The weight changing direction decision unit 31 changes the weight changing direction between the steepest direction and the conjugate gradient direction in accordance with the selection signal produced from the learning iteration counting unit 31. The learning rate multiplier 61 multiplies the weight changing direction thus decided by a learning rate to provide a weight changing amount. Finally, the weight changing unit 16 changes the weight.

Figure 8:
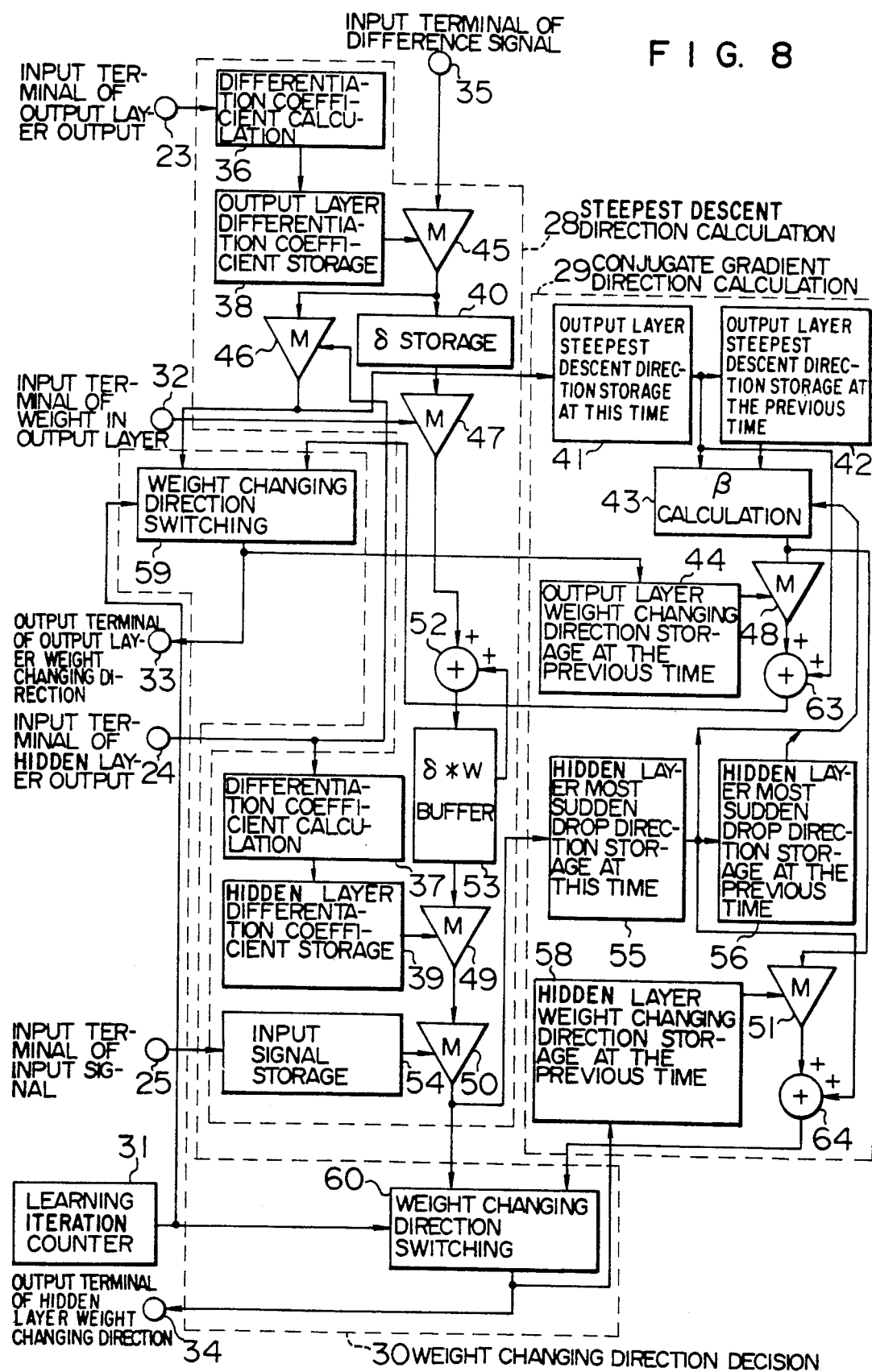
FIG. 8 is a block diagram of the detailed arrangement of a conjugate gradient deciding unit in the embodiment of FIG. 6.

The details of the conjugate gradient decision unit 15 are shown in FIG. 8. In FIG. 8, 32 is an input terminal of the weight of the output layer; 33 is an output terminal of the direction of changing the weight of the output layer; 34 is an output terminal of the direction of changing the weight of the hidden layer; 35 is an input terminal of the difference signal; 36 and 37 are differentiation coefficient units; 38 is an output layer differentiation coefficient storage unit; 40 is a δ storage unit; 41 is a unit for storing the steepest descent direction in the output layer at this time; 42 is unit for storing the steepest descent direction in the output layer at the previous time; 43 is a β calculation unit; 44 is a unit for storing the direction of changing the weight of the output layer at the previous time; 45, 46, 47, 48, 49, 50 and 51 are multipliers; 52 is an adder; 53 is a δ * w buffer; 54 is an input signal storage unit; 55 is a unit for storing the steepest descent direction in the hidden layer in real time; 56 is a unit of storing the steepest descent direction in the hidden layer at a previous time; 58 is a unit of storing the direction of changing the weight of the hidden layer at the previous time; 59 and 60 are weight changing direction switching unit; and 63 and 64 are adders.

With reference to FIG. 8, detailed explanation will be given for the operation of the conjugate gradient direction decision unit 15. The steepest descent direction calculation unit 28 has substantially the same arrangement as that of the steepest descent calculation unit 215 of the conventional learning machine with multi-input single-output circuits as shown in FIG. 5. The multiplier 46 provides the steepest descent direction relative to the weight of the output layer, and the multiplier 51 provides the steepest descent direction relative to the hidden layer. The signals indicative of these steepest descent directions are sent to the weight changing direction switching units 59 and 60 in the weight changing direction decision unit 30 and also to the real time output layer steepest direction storage unit 41 and the real time hidden layer steepest descent steepest descent direction storage unit 55 in the conjugate gradient direction calculation unit 29.

Using Equation (12), the β on the basis of the steepest descent directions stored in the learning at real time store in the storage units 41 and 55 and the steepest descent directions stored in the learning at the previous time stored in the previous time output layer steepest descent direction storage unit 56. The multipliers 48 and 51 acquire products, of β thus obtained and the weight changing directions d in the previous learning. The adders 63 and 64 acquire sums of these products and the steepest descent directions at this time. These sums are sent, as conjugate gradient directions, to the weight changing direction switching units 59 and 60.

On the other hand, the learning iteration counting unit 31 counts the iteration of learning and provides such selection signals as "select the steepest descent direction" as the weight changing direction for the learning in every number of iterations equal to the number of the weights and "select the conjugate gradient direction for the learning carried out in every number of other iterations." The weight changing direction switching units 59 and 60 switch the weight changing direction between the steepest descent direction and the conjugate gradient direction in accordance with these selection signals.

In this way, in the learning machine according to this embodiment, the conjugate gradient direction decision unit 15 decides whether the steepest descent direction or the conjugate gradient direction is the weight changing direction. If the conjugate gradient direction is selected as the weight changing direction, then the weight is changed to a direction different from the weight changing direction in the learning up until the previous iteration; this conjugate gradient direction is generally the most effective direction. In accordance with this embodiment, the learning is completed in a shorter time than in the conventional learning machine which adopts the steepest descent direction as the weight changing direction.

Incidentally, although in this embodiment, the steepest descent direction is adopted as the weight changing direction for the learning carried out in every number of iterations equal to that of the weights, the conjugate gradient direction may be adopted in all the iterations other than first time learning, or the steepest descent direction may be adopted for the learning to be carried out in every number of iterations equal to half of the number of the weights. Moreover, although in this embodiment, the hidden layer 22 includes of the multi-input single-output circuits, each of which processes two input signals to provide an output signal, as in the general arrangement of the conventional learning machine shown in FIG. 1, the hidden layer 22 may consist of any number of the multi-input single-output circuits; and it may consist of the multi-input single-output circuits connected in a hierarchical structure.

Figure 9:
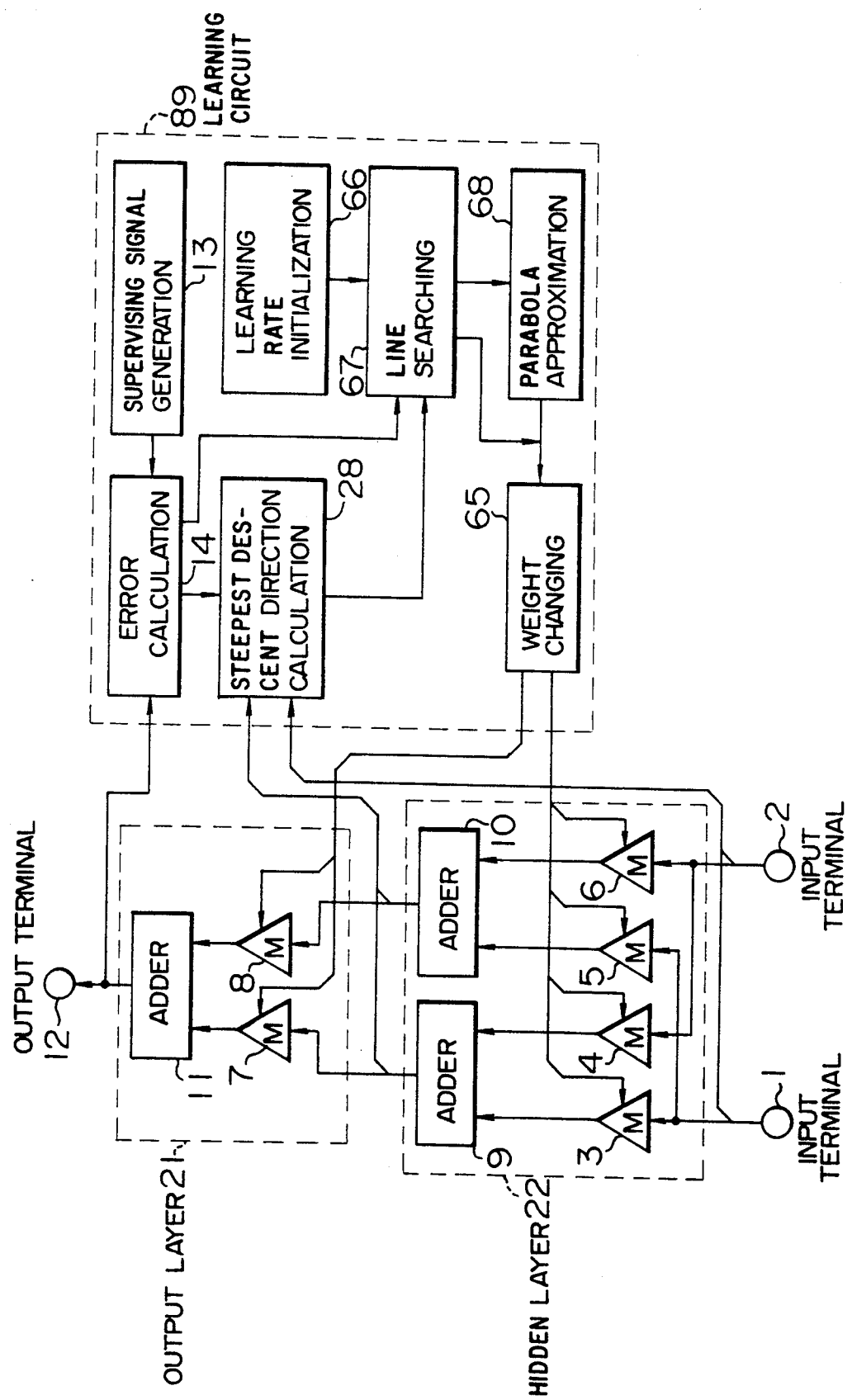
FIG. 9 is a block diagram showing the learning machine with multi-input single-output circuits connected in a hierarchical structure according to the second embodiment of the present invention.

FIG. 9 shows an arrangement of the learning machine with multi-input single-output circuits connected on a hierarchical structure according to the second embodiment of the present invention. In FIG. 9, 65 is a weight changing unit; 66 is a learning rate initialization unit; 67 is a searching unit; 68 is a parabola approximation unit; and 69 is a learning circuit.

As seen from comparison between FIGS. 2 and 9, this embodiment differs from the conventional learning machine in that the learning rate initialization unit 66, the line searching unit 67 and the parabola approximation unit 68 are provided. Specifically, in the conventional learning machine, the learning parameter is fixed whereas, in this embodiment, the weight changing amounts for plural learning rates are acquired by the line searching unit 67, the error for each learning rate is acquired by the hidden layer 22, the output layer 21 and the error calculation unit 14, and the error curve is parabola-approximated from the errors for the learning rates with smaller errors by the parabola approximation unit 68 so as to provide the errors at the top of the parabola; using the learning rates of these errors the weights are changed by the weight changing unit 65.

Figure 10:
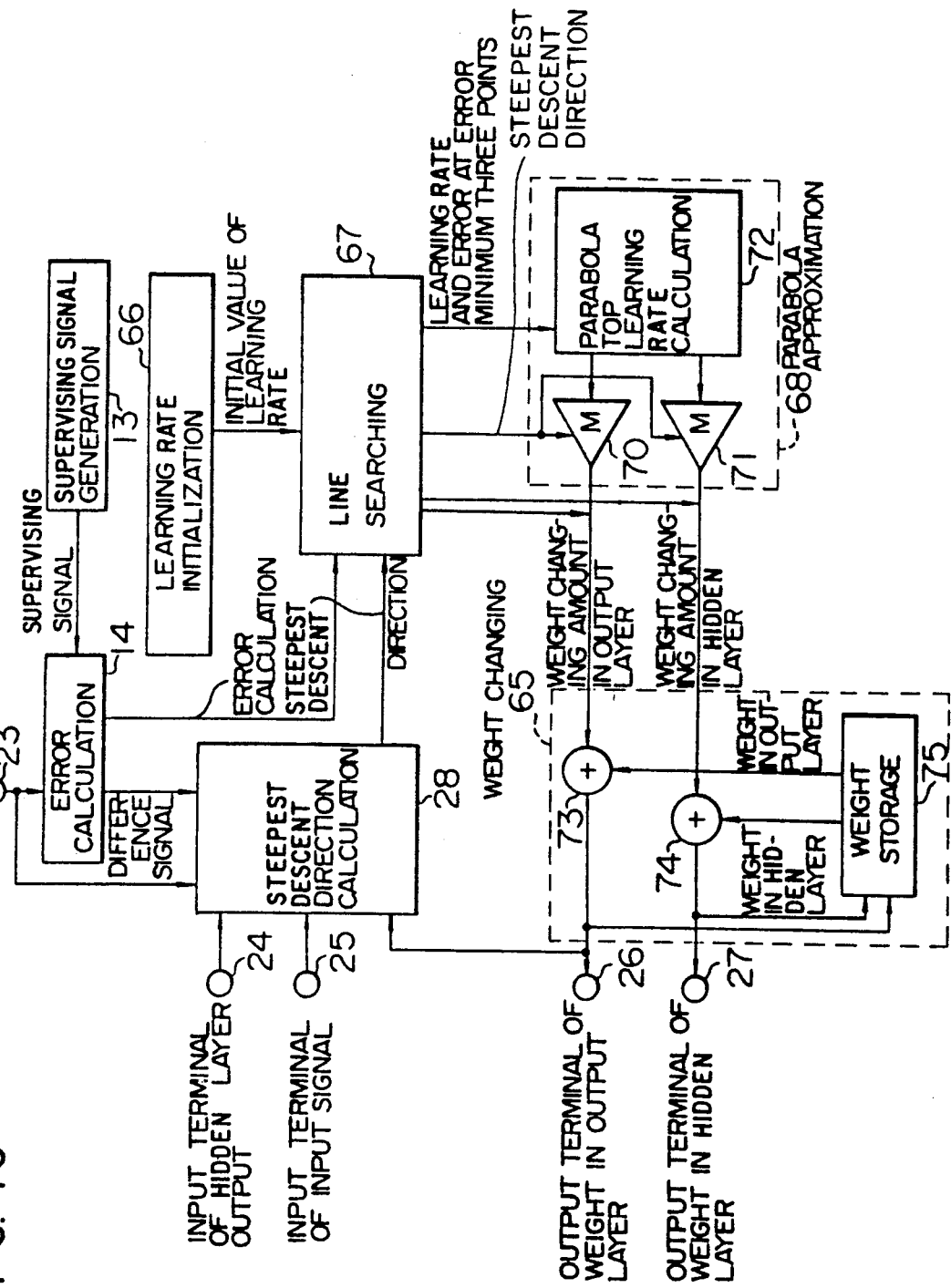
FIG. 10 is a block diagram showing the arrangement of the learning circuit in the embodiment of FIG. 9.

FIG. 10 shows an arrangement of the learning circuit according to this embodiment. In FIG. 10, 70 and 71 are multipliers; 72 is a unit of calculating the learning rate at the top of a parabola; 73 and 74 are adders; and 75 is a weight storage unit. The supervising signal generating unit 13 generates a supervising signal for the input signals, and the error calculation unit 14 produces a difference signal and error between the actual output signal and the supervising signal. The steepest descent direction calculation unit 28 acquires the steepest descent direction as the weight changing direction on the basis of the above error, the output signal from the output layer, the output signals from the hidden layer, the input signals, and the weight of the output layer.

Figure 11:
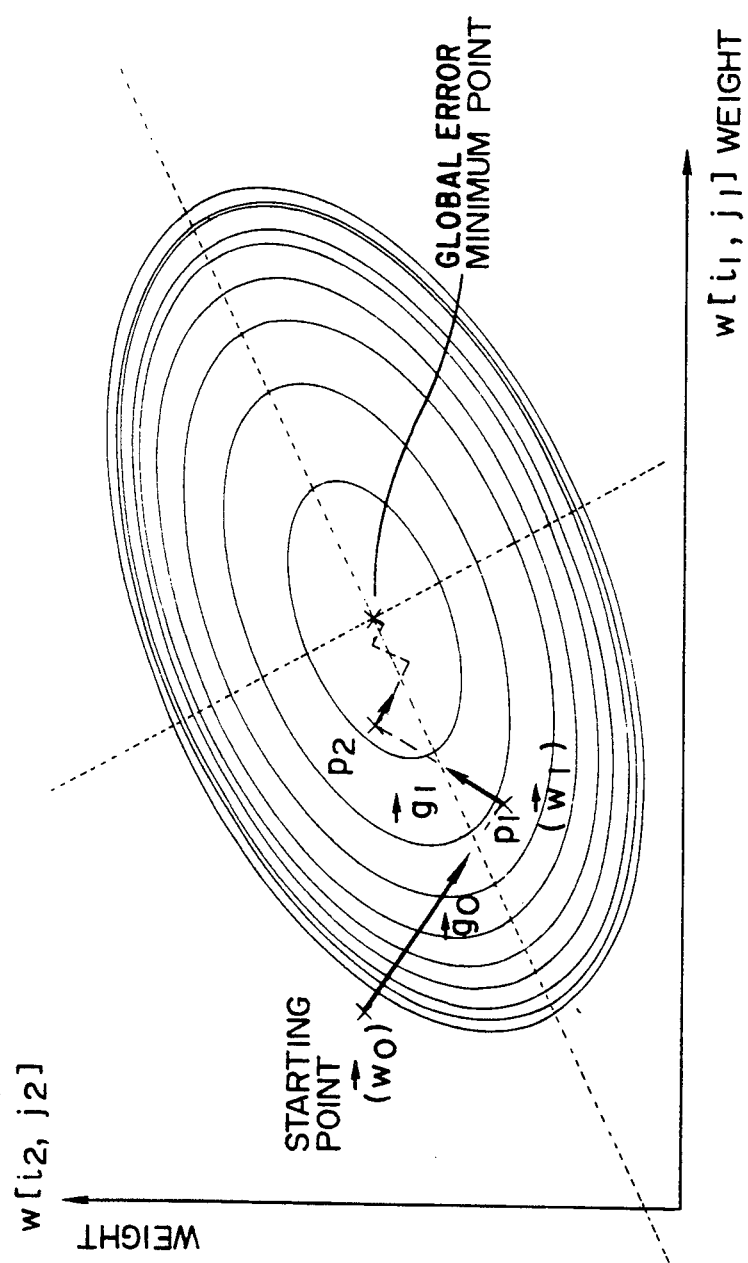
FIG. 11 is a schematic view of contour lines of an error curve for explaining the operation of the embodiment of FIG. 9.

As expressed in Equation (2), the error E, which is the function of a weight vector, can be represented by a curve in the weight space where the weights in the variable weight multipliers 3, 4, 5, 6, 7 and 8 are represented in vector form. This curve is referred to as an error curve. FIG. 11 schematically shows contour lines in the error curve for explaining the operation in this embodiment. In FIG. 11, $w[i_1, j_1]$ and $w[i_2, j_2]$ are weights to be multiplied by any two multipliers of the variable multipliers 3, 4, 5, 6, 7 and 8; $w_o$ is vector representation of the value of the weights initialized by a random number; $g_o$ is the steepest descent direction in the first learning; $p_1$ is an error minimum point in the first iteration of the learning; $g_1$ is the steepest descent direction at point $p_1$; and $p_2$ is an error minimum point in the second iteration of the learning. In the iteration by the learning machine according to this embodiment, the weights in all the multipliers are first initialized by random numbers; this means that the starting point ($w_o$) on the error curve in FIG. 11 is set for the random numbers. The object of the learning is, by changing the weights to the direction where the error decreases from the starting point on the error curve in FIG. 11, to repeat the search of the error minimum point to reach the global error minimum point. In the first learning, the steepest descent direction $g_o$ expressed by Equation (4) is set as the weight changing direction, and the point where the error in the direction of $g_o$ is minimum is acquired. This is referred to as line searching in the direction of $g_o$. The learning rate initialization unit 66 produces a positive value which is suitable as an initial value of the learning rate in the line searching.

Figure 12:
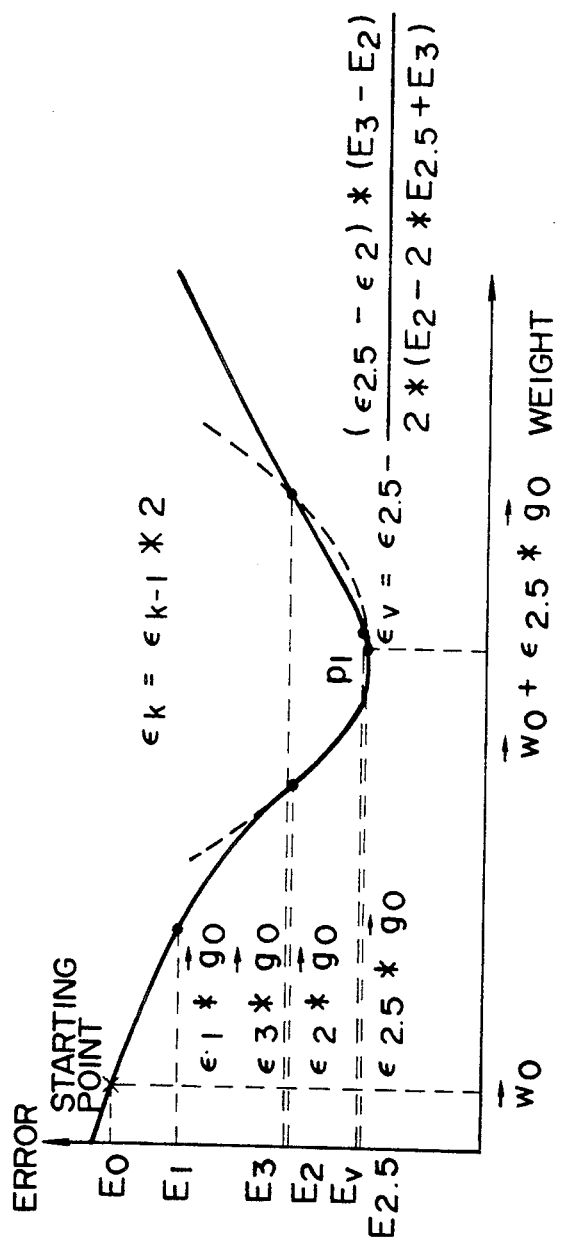
FIG. 12 is a cross-sectional view between the starting point and point p of the error curve for showing the operation of the embodiment of FIG. 9.

FIG. 12 shows the cross-section between the starting point and point $p_1$ on the error curve for explaining the operation in this embodiment. In FIG. 13, $\epsilon_1$ is an initial value of the learning rate which can be expressed by $$\epsilon_k = \epsilon_{k-1} * 2 \quad (k > 1) \tag{13}$$

$E_k (k \geq 0)$ is an error for the learning rate $\epsilon_k$ which can be expressed by $$E_k = E(\vec{w_o} + \epsilon_k * \vec{g_o}) \quad (k \geq 0, \epsilon_0 = 0) \tag{14}$$

$\epsilon_v$ is a learning rate at the top of the parabola-approximated error curve; and $E_v$ is an error for the learning rate $\epsilon_v$.

FIG. 13 is a PAD (Problem Analysis Diagram) for explaining the operation of line searching in the learning machine with multi-input single-output circuits connected in a hierarchical structure according to this embodiment. In the line searching, first, an error for the initial learning rate $\epsilon_1$ is acquired. Specifically, the line searching unit 67 multiplies the initial value $\epsilon_1$ by the steepest descent direction $g_0$ to provide a weight changing amount for the initial value $\epsilon_1$; this weight changing amount is supplied to the weight changing unit 65 (FIG. 10). In the weight changing unit 65, the adder 73 acquires a sum of the weight changing amount in the output layer and the weight of the output layer, and the adder 74 acquires a sum of the weight changing amount in the hidden layer and the weight of the hidden layer. Thus, the weight changing unit 65 produces the weights for the initial value $\epsilon_1$ of the learning rate from the weight output terminal 26 for the output layer and the weight output terminal 27 for the hidden layer. Using these weights, the output signals from the hidden layer 22 and the output layer 21 are acquired, and the error is acquired by the error calculation unit 14 by comparing the supervising signal with the output signal from the output layer 21. In this way, the initial error $E_1$ for the initial learning rate is acquired.

As seen from the PAD FIG. 13, the line searching unit 67 compares the initial error $E_1$ with the error $E_0$ at the starting point on the error curve. If $E_1$ is smaller than $E_0$, it can be expected that the error for the larger learning rate is smaller; the operation of doubling the learning rate is repeated until the error starts to increase. In the first learning shown in FIG. 12, $E_1 \geq E_0$ so that the operation of doubling the learning rate $\epsilon$ is repeated to provide the corresponding error. Then $E_0 > E_1 > E_2 > E_3$ so that the line searching unit 67 acquires the weight changing amount for up to the learning rate $\epsilon_3$. On the other hand, if $E_1$ is larger than $E_0$, it can be expected that the error for the smaller learning rate is smaller; the operation of decreasing the learning rate by half is repeated until the error becomes smaller than the error at the starting point. Next, the line searching unit 67, in order for the parabola approximation unit 68 to approximate the neighborhood of the error minimum point, calculates the errors at the points on the weight space in FIG. 12 where the weight varies at regular intervals. Specifically, assuming that $$\epsilon_{2.5} = (\epsilon_2 + \epsilon_3)/2 \quad (15)$$

and so $\epsilon_2 - \epsilon_1 = \epsilon_{2.5} - \epsilon_2 = \epsilon_3 - \epsilon_{2.5}$, the error $\epsilon_{2.5}$ can be expressed by $$E_{2.5} = E(\vec{w_0} + \epsilon_{2.5} * \vec{g_0}) \quad (16)$$

In FIG. 12, $E_{2.5} < e_2 < E_3 < E_1$, so that errors $E_2$, $E_{2.5}$, $E_3$ give the three minimum errors and the learning rates $E_2$, $E_{2.5}$ and $E_3$ are sent to the unit 72, of calculating the learning rate at the top of the parabola approximation unit 65. The unit 72 approximates the error curve in the neighborhood of the error minimum point by the parabola passing the three minimum error points to provide the error near the top. Namely, the calculation unit 72 calculates the learning rate at the top of the parabola-approximated error curve using $$\epsilon_v = \epsilon_{2.5} - \frac{(\epsilon_{2.5} - \epsilon_2) * (E_3 - E_2)}{2 * (E_2 - 2 * E_{2.5} + E_3)} \quad (17)$$

The multipliers 70 and 71 multiplies the steepest descent $g_o$ by $\epsilon_v$ to provide a weight changing amount; the weight changing unit 65 sets the weight for the learning rate $\epsilon_v$; the hidden layer 22 and the output layer 21 acquire the output signals (FIG. 9); and the error calculation unit 14 acquires the error $E_v$. The parabola approximation unit 68 compare the errors thus obtained $E_v$, $E_2$, $E_{2.5}$, and $E_3$, and acquires the weight changing amount $\epsilon_{2.5} * g_o$ for the learning rate $\epsilon_{2.5}$, which provides the smallest error $E_{2.5}$. The adder 73 and 74 acquire a sum of the weight changing amount and the weight $w_o$, and store it as a new weight, respectively. Thus, the weight vector is changed as expressed by $$\vec{w}_{-1} = \vec{w}_o + \epsilon_{2.5} * \vec{g}_o$$

The explanation hitherto made relates to the first iteration of the learning.

In the second iteration of the learning, the steepest descent direction calculation unit 28 acquires, as a weight changing direction, the steepest descent direction $g_1$ at point $P_1$ expressed by $w_1$ in the weight space (FIG. 11). The learning rate initialization unit 66 sets the initial learning rate $\epsilon_1$ for the first iteration of the learning and the larger value between $\epsilon_1$ and the rate used in the previous for the second iteration of the learning et seg. That is, in the second iteration of the learning et seg., if an optimum value of the previous learning rate is larger than $\epsilon_1$, the optimum value of the previous learning rate is adopted as an initial learning rate; if the former is smaller than the latter, $\epsilon_1$ is adopted as an initial learning rate. Thus, the optimum value of the previous learning rate can be used as an initial learning rate in the present learning to effectively set the learning rate which is optimum for the present learning. Also, if the optimum value of the previous learning rate is smaller than $\epsilon_1$, $\epsilon_1$ is used as an initial learning rate for searching the error minimum point in the present learning. This permits the error minimum point to reach a global error minimum point. The line searching unit 67 varies the learning rate by twice or half in the direction of $g_1$ to provide a weight changing amount decreasing the error. The parabola approximation unit 68 parabola-approximates the error curve to acquire the weight giving a minimum error of $g_1$, thus providing an error minimum point $P_2$ in the second iteration of the learning.

In this way, in the learning machine according to this embodiment, by repeating the searching in the steepest descent direction, the optimum learning rate is dynamically set to decrease the error and to approach the global error minimum point. In accordance with this embodiment, the line searching until 65 makes the learning rate variable when the weight is changed by the weight changing unit 65, and sets the learning rate dynamically giving the minimum error in the weight changing direction. Thus, the time required for the learning is shortened.

Incindentially, although in this embodiment, the learning initialization unit 66 sets the initial learning rate $\epsilon_1$ for the first iteration of the learning and the larger value between $\epsilon_1$ and the learning rate used in the previous iteration for the second iteration of the learning et seq., it may fix the initial value to $\epsilon_1$. Moreover, although in this embodiment, the hidden layer 22 includes multi-input single-output circuits each of which processes two input signals to provide an output signal. As in the general arrangement of the conventional learning machine shown in FIG. 1, the hidden layer 22 may consist of any number of the multi-input single-output circuits and it may consist of the multi-input single-output circuits connected in a hierarchical structure.

Figure 14:
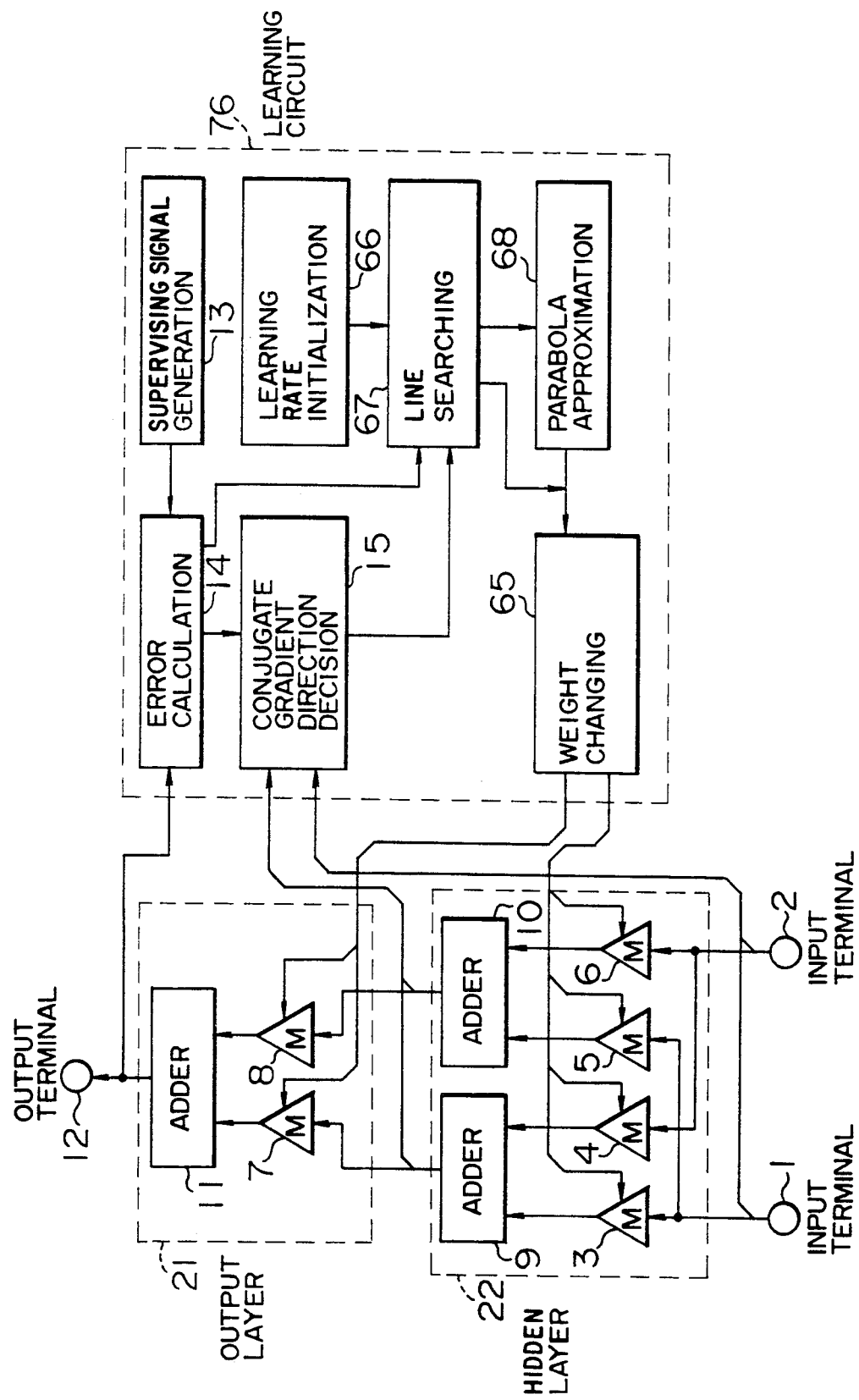
FIG. 14 is a block diagram showing the learning machine with multi-input single-output circuits connected in a hierarchical structure according to the third embodiment of the present invention.
Figure 15:
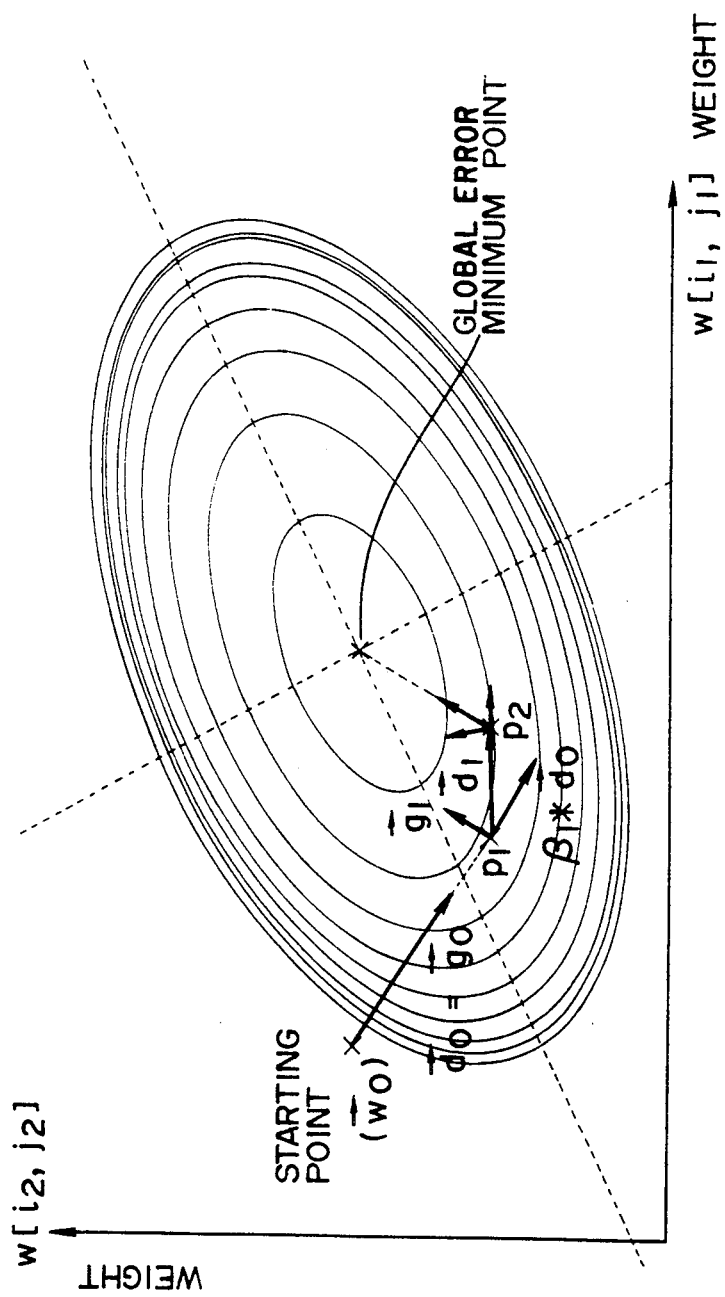
FIG. 15 is a schematic view of contour lines of an error curve for explaining the operation of the embodiment of FIG. 14.

FIG. 14 shows an arrangement of the learning machine with multi-input single-output circuits connected in a hierarchical structure according to a third embodiment of the present invention. As seen from comparison with FIG. 9, a learning circuit 76 in this embodiment differs from the second embodiment of FIG. 69 in that the steepest descent direction calculation unit 28 is replaced by the conjugate gradient direction decision unit shown in FIG. 6. In this embodiment, the error calculation unit 14 calculates the error from the difference between supervising signals and actual output signals. The conjugate gradient direction decision unit 15 sets the weight changing direction to the steepest descent direction expressed by Equation (4) for the first iteration of the learning to be carried out for every number of iterations to the number of weights, and sets to the conjugate gradient direction for the learning to be carried out in every other number of iterations. The learning initialization unit 66 sets the initial learning rate $\epsilon_1$ for the first iteration of the learning, and the larger value between $\epsilon_1$ and the learning rate used in the previous iteration for the second iteration of the learning et seq. The line searching unit 67, if the error for an initial learning rate is smaller than the error at the starting point, repeats an operation of doubling the learning rate $\epsilon$ until the error starts to increase, or the line searching unit 67, if the error for an initial learning rate has exceeded the error at the starting point. FIG. 15 schematically shows contour lines in the error curve for explaining the operation in this embodiment. In FIG. 15, $w[i_1, j_1]$ and $w[i_2, j_2]$ are weights to be multiplied by any two multipliers of the variable multipliers 3,4,5,6,7 and 8; $w_o$ is vector representation of weights initialized by random numbers; $g_o$ is the steepest descent direction in the first iteration of the learning; $g_1$ is the steepest descent direction at point $P_1$; $B_1$ is a constant obtained by Equation (12) in acquiring the conjugate gradient direction at $P_1$ expressed by Equation (11); and $P_2$ is an error minimum point in the second iteration of the learning.

In this embodiment, the error minimum point $P_1$ in the first iteration of the learning is acquired in the same way in the second embodiment. Thereafter, the weight changing direction in the second iteration of the learning is set to the conjugate gradient direction expressed by Equation (11) using the steepest descent direction $g_1$ at $P_1$ and to the weight changing direction $g_o (=d_o)$ in the first iteration of the learning. The error minimum point $P_2$ for the direction of $d_1$. Because the conjugate gradient direction is adopted as the weight changing direction in FIG. 15, the error can be minimized in less iterations than in the case of FIG. 11 where the steepest descent direction is adopted as the weight changing direction. The reason is that the conjugate gradient method, in which the weight changing directions in a weight space at respective iterations of learning are set to be different from one another, can change the weight more effectively than the steepest descent method wherein the weight is changed on the basis of the local gradient on a weight curve. In this way, in accordance with this embodiment, a weight changing direction is set to the conjugate gradient direction by the conjugate gradient direction decision unit 15, the learning rate is acquired by the line searching unit 67 and the parabola approximation unit 68 so that the error can be minimized in the weight changing direction, and optimum learning rate is used to change the weight by the weight changing unit 65. Thus, the time required for learning is shortened.

Additionally, in this embodiment, the conjugate gradient direction decision unit 15 sets the weight changing direction to the steepest descent direction expressed by Equation (4) for the first iteration of the learning, and for the second iteration of the learning et seq., sets to steepest descent direction for the learning to be carried out in every number of times equal to the number of weights, and the conjugate gradient direction for the learning to be carried out in learning et seq., to the steepest descent direction for the learning to be carried out in every half number of iterations equal to the number of weights, and sets to the conjugate gradient direction for the learning to be carried out in every other number of iterations. Moreover, if the error does not become smaller than the error at the starting point although the line searching in the conjugate gradient direction has been done to make the learning rate smaller than a predetermined value $\epsilon_{min}$, the weight changing direction to the steepest descent direction when the conjugate gradient direction is not suitable as the weight changing direction, the global error minimum point can be reached in a shorter time. Moreover, in this embodiment, the hidden layer 22 includes the multi-input single-output circuits each of which processes two input signals to provide and output signal, as in the general arrangement of the conventional learning machine shown in FIG. 1, the hidden layer 22 may consist of any number of the multi-input single-output circuits and it may consist of the multi-input single-output circuits connected in a hierarchical structure.

Figure 16:
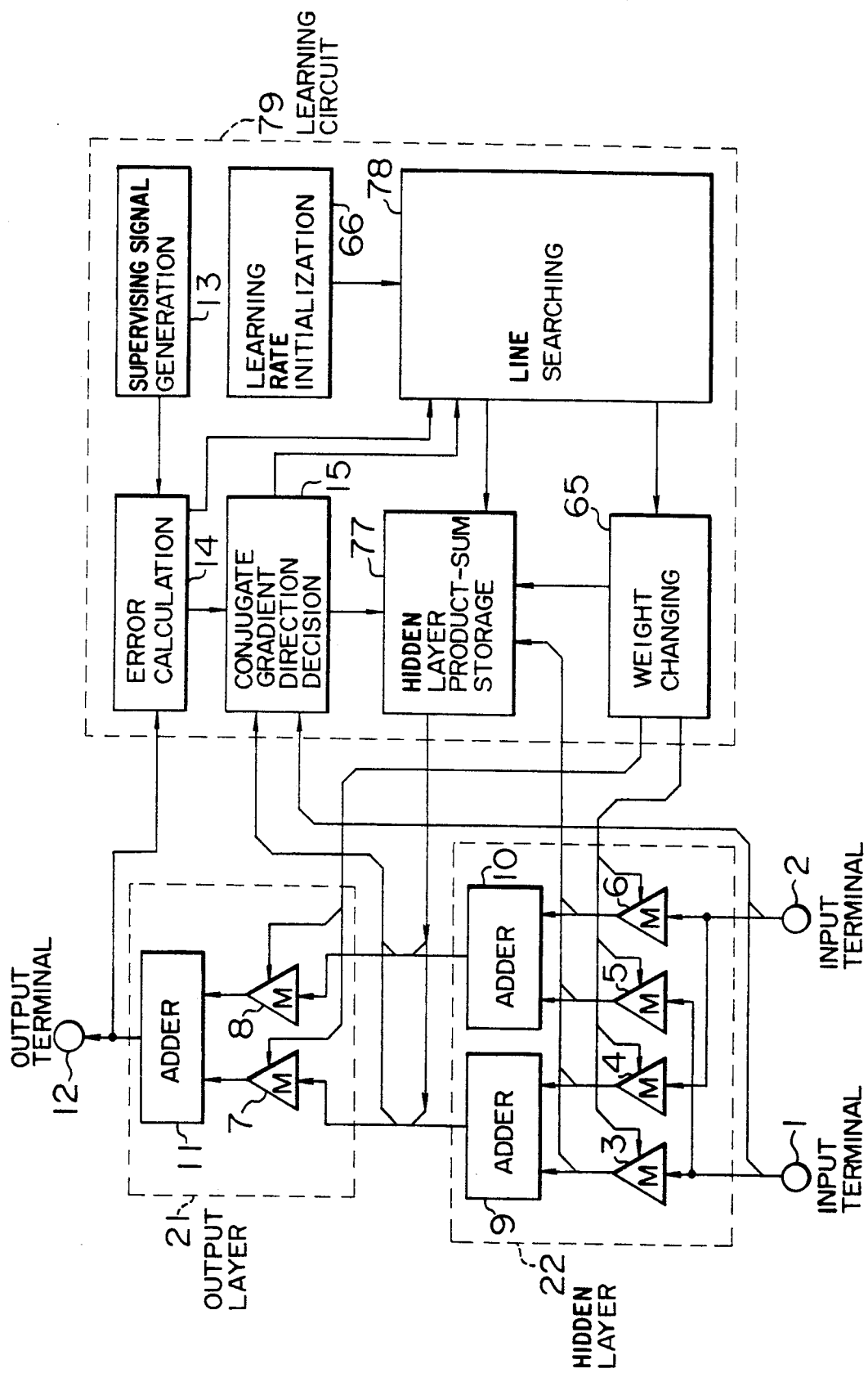
FIG. 16 is a block diagram showing the learning machine with multi-input single-output circuits connected in a hierarchical structure according to the fourth embodiment of the present invention.
Figure 17:
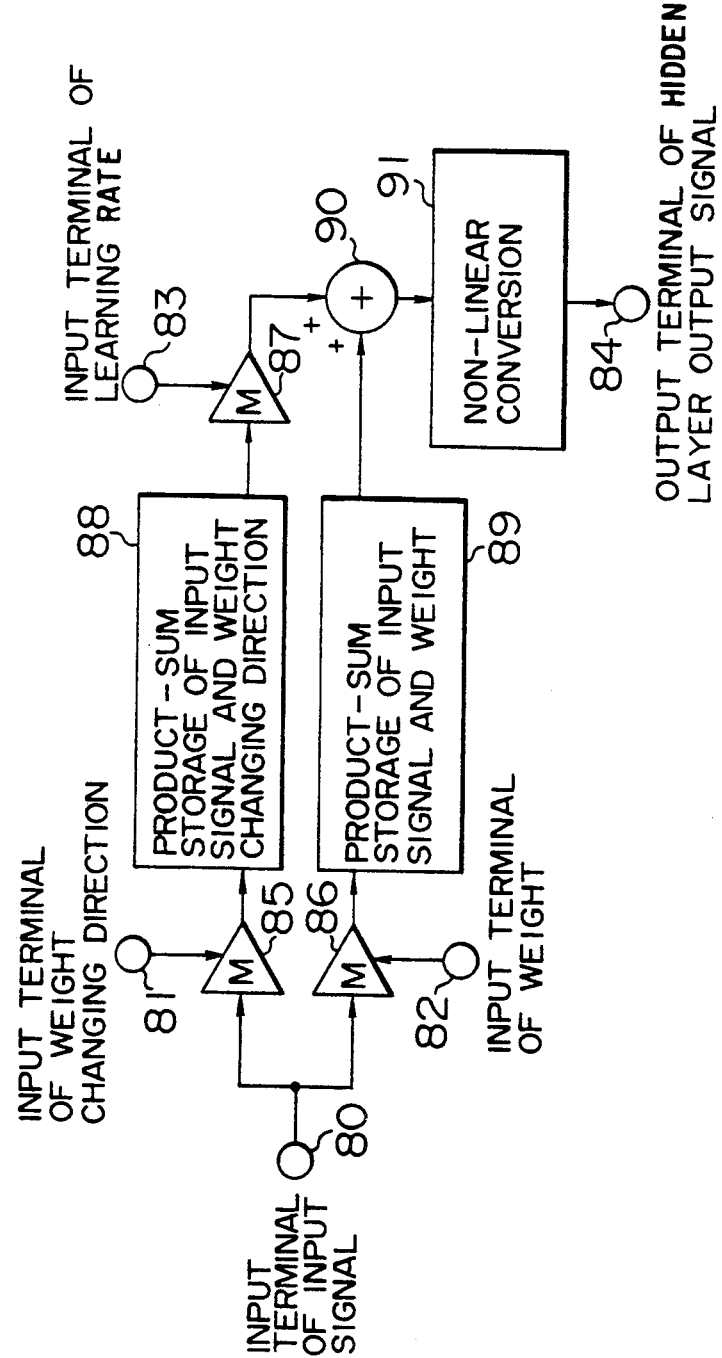
FIG. 17 is a block diagram showing the detailed arrangement of a hidden layer product sum storage unit in the embodiment of FIG. 16.

FIG. 16 shows an arrangement of the learning machine with multi-input single-output circuits connected in a hierarchical structure according to a fourth embodiment of the present invention. In FIG. 17, 22 is a hidden layer product-sum storage unit; 78 is a line searching unit; and 79 is a learning circuit. In this embodiment, the error calculation unit 14 calculates the error from the difference between supervising signals and actual output signals. The conjugate gradient direction decision unit 15 set the weight changing direction to the steepest descent direction expressed by Equation (4) for the first iteration of the learning, and for the second iteration of the learning et seq., sets to the steepest descent direction for the learning to be carried out in every number of iterations equal to the number of weights, and sets to the conjugate gradient direction for the learning to be carried out in every other number of iterations.

The learning initialization unit 66 sets the initial learning rate, and the larger value between $\epsilon_1$ and the second iteration of the learning et seq. The straight line searching unit 78 in this embodiment is a combination of the line searching unite 67 and the parabola-approximation unit 68 in FIG. 14. The line searching unit 78, therefore, if the error for an initial learning rate is smaller than the error at the starting point, repeats the operation of doubling the learning rate $\epsilon$ to provide a weight changing amount until the error starts to increase; or the line searching unit 78, if the error for an initial learning parameter has exceeded the error at the starting point, repeats an operation of decreasing learning rate by half to provide a weight changing amount until the error becomes smaller than the error at the starting point. Thereafter, the line searching unit 78 approximates the error curve in the neighborhood of the error minimum point by the parabola passing the three minimum error points to provide the error near the top. In this way the weight changing direction is fixed, the line searching unit 78 varies the learning rate, and acquires a weight changing amount for minimum error; this embodiment is different from the third embodiment in that the output signal from the hidden layer is acquired through the hidden layer product-sum storage unit.

FIG. 17 shows the details of the hidden layer product-sum storage unit 77 in a block form. in FIG. 17, 80 is the input terminal or input signals; 81 is the input terminal of changing directions; 82 is the input terminal of weights; 83 is the input terminal of a learning parameter; 84 is the output terminal of hidden layer output signal; 85, 86, 87 are multipliers; 88 is a unit of storing the product-sum of the input signals and the changing directions; 90 is an adder; and 91 is a non-linear conversion unit. The hidden layer output signal $y_p[i]$ can be expressed by $$y_p[j] = fnc \, (\epsilon(w \, [i,j]^* \, y_p[i])) \quad (18)$$

where $w[i,j]$ is the weight multiplied by the input signal $y_p[i]$ when it is supplied to the j-th multi-input single-output circuit, and fnc ( ) is a characteristic function of the adders included in the hidden layer; this characteristic function is a non-linear function having a saturation characteristic. Assuming that the component of the weight changing direction decision unit 15 which corresponds to the changing amount of $w[i,j]$, is $d[i,j]$. hidden layer output signal $y_p[j]$ for learning rate $\epsilon$ is expressed by $$y_p[j] = fnc(\epsilon((w[i,j] + \epsilon^* d[i,j])^* y_p[i])) \quad (19)$$

Therefore, it is necessary to carry out the multiplication twice the number of the input signals whenever $y_p[j]$ is to be acquired. In this embodiment, by previously storing, in the storage unit 89 for the product-sum of the input signals and the weights, $$A_p[j] = \sum_i (d[i,j] * \gamma_p[i]) \quad (20)$$

and in the storage unit 89 for the product-sum of the input signals and the weight changing directions, $$B_p[j] = \sum_i (d[i,j] * y_p[i]) \quad (21)$$

the hidden layer output signal $y_p[j]$ for the learning rate $\epsilon$ can be acquired by $$\begin{aligned} y_p[j] &= fnc \left( \sum_i ((w[i,j] + \epsilon * d[i,j]) * y_p[i]) \right) \\ &= fnc \left( \sum_i (w[i,j] * y_p[i]) + \epsilon * \sum_i (d[i,j] * y_p[i]) \right) \\ &= fnc(A_p[j] + \epsilon * B_p[j]) \end{aligned} \quad (22)$$

Namely, the multiplier 87 multiplies the learning rate $\epsilon$ by the output $B_p[j]$ from the storage unit 88 for the product-sum of input signals and weight changing direction, and the adder 90 acquires the sum $(A_p[j] + \epsilon^* B_p[j]$ thus obtained, and the output $A_p[j]$ from storage unit 89 for the product-sum of input signals and weights. The non-linear conversion unit 91 subject the output from the adder 90 to the non-linear conversion equivalent to the characteristic function of the adders in the hidden layer to provide $y_p>[j]$ expressed by Equation (22). In this way, in the line searching along for the weight changing direction $d$, multiplication is required the same number of times as in the third embodiment to provide the hidden layer output signal $y_p[j]$ for the initial learning rate; and the multiplication is required only once to provide the hidden layer output signal $y_p[j]$ for the other learning rate. This greatly reduces the number of operations in the line searching thereby shortening the time required for learning.

Additionally, although in this embodiment the weight changing direction is set to the conjugate gradient direction decision unit 15, it may be set to the steepest descent direction. Moreover, although in this embodiment, the hidden layer 22 consists of the multi-input single-output circuits each of which processes two input signals to provide an output signal, as in the general arrangement of the conventional learning machine shown in FIG. 1, the hidden layer 22 may consist of any number of the multi-input single-output circuits, and it may consist of the multi-input single-output circuits connected in a hierarchical structure.

Figure 18:
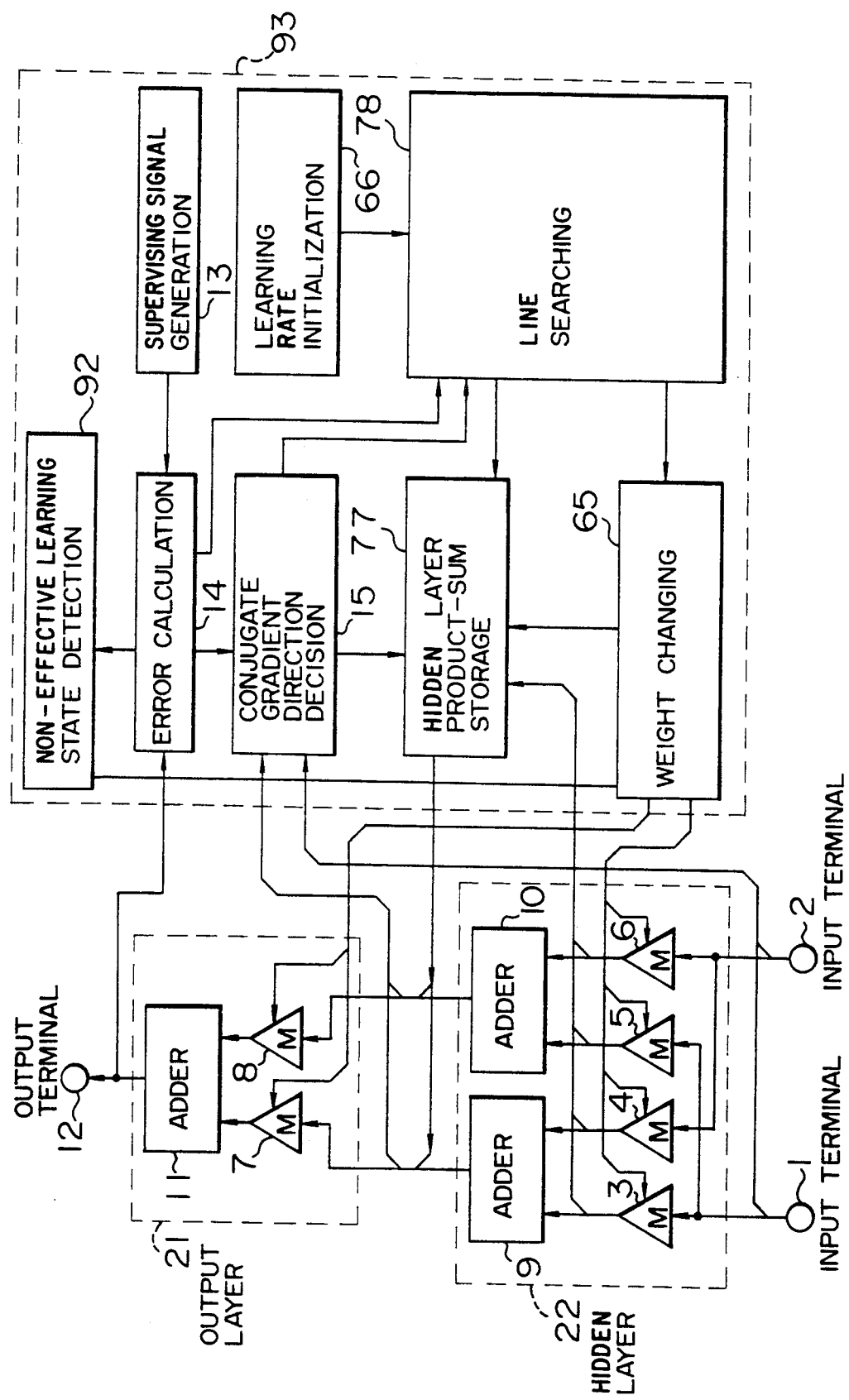
FIG. 18 is a block diagram showing the learning machine with multi-input single-output circuits connected in a hierarchical structure according to the fifth embodiment of the present invention.

FIG. 18 shows an arrangement of the learning machine with multi-input single-output circuits connected in a hierarchical structure according to the fifth embodiment of the present invention. In FIG. 18, 92 is non-effective learning state detection unit, and 93 is a learning circuit. In the learning machine according to this embodiment, the conjugate gradient direction decision unit 15 decides a weight changing direction; the searching unit 78 sets plural learning rates in the weight changing direction to provide a weight changing amount giving a minimum error; and the weight changing unit 65 changes the weight. The non-effective learning detection unit 92 compares the error before the weight changing with the result after the weight changing; then the weight changing direction is steepest descent direction and also the decreasing rate of the error is smaller than a certain value, the non-effective learning detection unit 92 detects that the learning has fallen into a state where further learning cannot effectively reduce the error, and initializes the weights by random numbers to restart the learning. In this way, in accordance with this embodiment, when the learning has stalled it is detected by the non-effective state detection unit 92, and the weight is readjusted to restart the learning. This prevents the learning from stalling and shortens the time required for the learning.

Additionally, although in this embodiment, the non-effective state detection unit 92 detects the non-effective learning state by detecting that the weight changing direction is the steepest descent direction and also the error decreasing rate is smaller than a certain value, the non-effective state may be detected by detecting that the absolute value of the weight is larger than a certain value. Moreover, although in this embodiment, the weights are adjusted by initializing all the weights by random number, they may be adjusted by equally compressing all the weights or only by compressing only the maximum weight. Further, although in this embodiment, the hidden layer 22 consists of the multi-input single-output circuits each of which processes two input signals to provide and output signal, as in the general arrangement of the conventional learning machine as shown in FIG. 1, the hidden layer 22 may consist of any number of the multi-input single-output circuits and it may consist of the multi-input single-output circuits connected in a hierarchical structure.

We claim:

1. A learning machine with multi-input single-output circuits connected in a hierarchical structure, comprising:
   a hidden layer including a plurality of multi-input single-output circuits which subject a weighted sum of input signals to non-linear processing by a characteristic function having a saturation characteristic in order to provide first output signals;
   an output layer comprising a plurality of multi-input single-output circuits which subject a weighted sum of said first output signals from said hidden layer to non-linear processing by a characteristic function having a saturation characteristic in order to provide second output signals;
   a supervising signal generating unit or generating supervising signals for said output layer;
   a weight changing direction decision unit for selecting and deciding, from plural directions, a weight changing direction that minimizes errors between outputs from said supervising signal generating unit and said second outputs from said output layer;
   a weight changing unit for changing weights on the basis of the weight changing direction acquired by said weight changing direction deciding unit, wherein said weight changing direction decision unit sets said weight changing direction to either a conjugate gradient direction or the steepest descent direction.

2. A learning machine with multi-input single-output circuits connected in a hierarchical structure, comprising:
   a hidden layer including a plurality of multi-input single-output circuits which subject a weighted sum of input signals to non-linear processing by a characteristic function having a saturation characteristic in order to provide first output signals;
   an output layer comprising a plurality of multi-input single-output circuits which subject a weighted sum of said first output signals from said hidden layer to non-linear processing by a characteristic function having a saturation characteristic in order to provide second output signals;
   a supervising signal generating unit of generating supervising signals for said output layer;
   a weight changing direction decision unit for selecting and deciding, from plurality directions, a weight changing direction that minimizes errors between outputs from said supervising signal generating until nd said second outputs from said output layer;
   a weight changing unit for changing widths on the basis of the weight changing direction acquired by said weight changing direction deciding unit, wherein said weight changing direction decision unit sets said weight changing direction to the steepest direction for a first iteration of learning, and for a second iteration of learning et seq., sets the steepest descent direction for the learning o be carried to the number of iterations equal to the number of weights, and sets the conjugate gradient direction of the learning to be carried out to every other number of iterations.

3. A learning machine with multi-input single-output circuits connected in a hierarchical structure, comprising:
   a hidden layer including a plurality of multi-input single-output circuits which subject a weighted sum of input signals to non-linear processing by a characteristic function having a saturation characteristic in order to provide first output signals;
   an output layer comprising a plurality of multi-input single-output circuits which subject a weighted sum of said first output signals from said hidden layer to non-linear processing by a characteristic function having a saturation characteristic in order to provide second output signals;
   a supervising signal generating unit for generating supervising signals for said output layer;
   a weight changing direction decision unit for selecting and deciding, from plural directions, a weight changing direction that minimizes errors between outputs from said supervising signal generating unit and said second outputs from said output layer;
   a weight changing unit for changing weights on the basis of the weight changing direction acquired by said weight changing direction deciding unit, wherein said weight changing direction decision unit sets said weight changing direction to the steepest descent direction for a first iteration of learning, and for a second iteration of learning et seq., sets the steepest descent direction for learning one half to one half the number of iterations equal to the number of weights, and the conjugate gradient direction of the learning to be carried out every other number of iteration.

4. A learning machine with multi-input single-output circuits connected in a hierarchical structure, comprising:
   a hidden layer comprising of plural multi-input single-outputs circuits which subject a weighted sum of input signals to non-linear processing by a characteristic function having a saturation characteristic in order to provide first output signals;
   an output layer comprising plurality multi-input single-output circuits which subject as weighted sum of said output signals from said hidden layer to non-linear processing by a characteristic function having a saturation characteristic to provide second output signals;
   a supervising signal generating unit for generating supervising signals for said output layer;
   a weight changing direction decision unit for selecting and deciding, from plural directions, a weight changing direction that minimizes errors between said outputs form said supervising signal generating unit and said second outputs from said output layer;
   a line searching unit for producing weight changing amounts for plurally learning rates with respect to a weight changing direction; and
   a weight changing unit for selecting weight changing amounts acquired by said lien searching unit.

5. A learning machine with multi-input single-output circuits connected in a hierarchical structure according to claim 4, wherein said weight changing direction decision unit sets said weight changing direction o the steepest direction for a first iteration of learning, as well as for the second iteration of learning et seq., when the error does not become smaller than the error at a starting point said starting point being after line searching a in a conjugate gradient direction to make the learning rate smaller than a predetermined value, and after the conjugate gradient direction for the learning is set to be carried out for every other number of iteration.

6. A learning machine with multi-input single-output circuits connected in a hierarchical structure according to claim 4, wherein said weight changing direction decision unit sets said weight changing direction to the steepest direction for a first iteration of learning, as well as for the second iteration of learning et seq., when the error does not become smaller than the error at a starting point said starting point being after line searching, in a conjugate gradient direction to make the weight changing amount smaller than a predetermined value, and after the conjugate gradient direction for the learning is set to be carried out every their number of iteration.

7. A learning machine with multi-input single-output circuits connected in a hierarchical structure according to claim 4, wherein said weight changing unit changes weights according to a weight changing amount which minimizes an error.

8. A learning machine with multi-input single-output circuits connected in a hierarchical structure according to claim 4, wherein in producing the weight changing amounts for plurally learning rates with respect to the width changing direction, said line searching unit sets, for a second iteration of the learning et seal, an initial value of the learning rate to the larger between a fixed value and an optimum value produced by the previous iteration of learning.

9. A learning machine with multi-input single-output circuits connected in a hierarchical structure, comprising:
- a hidden layer comprising a plurality of multi-input single-output circuits which subject a weighted sum of input signals to non-linear processing by a characteristic function having a saturation characteristic in order to provide first output signals;
- an output layer comprising a plurality of multi-input single-output circuits which subject a weighted sum of said first output signals form said hidden layer to non-linear processing by a characteristic function having a saturation characteristic in order to provide second output signals;
- a supervising signal generating unit for generating supervising signals for said output layer;
- a weight changing direction decision unit for selecting and deciding, from plural directions, a weight changing direction that minimizes errors between said output from said supervising signal generating unit and said second outputs from said output layer;
- a line searching unit for producing weight changing amounts for plural learning rates with respect to a weight changing direction;
- a hidden layer product-sum storage unit for storing a product sum of input signals and weight of said hidden layer and a product sum of said input signals and said reaction of changing the weight of said hidden layer; and
- a weight changing unit for selecting weight changing amounts form th weight changing amounts acquired by said line a searching unit.

10. A learning machine with multi-input single-output circuits connected in a hierarchical structure, comprising:
- a hidden layer comprising a plurality of multi-input single-output circuits which subject a weighted sum of input signals to non-linear processing by a characteristic function having a saturation characteristic in order to provide first output signals;
- an output layer comprising a plurality of multi-input single-output circuits which subject a weighted sum of said first output signals form said hidden layer to non-linear processing by a characteristic function having a saturation characteristic in order to provide second output signals;
- a supervising signal generating unit for generating supervising signals for said output layer;
- a weight changing direction decision unit for selecting and deciding, from plural directions, w a weight changing direction that minimizes errors between outputs form said supervising signal generating unit and said second outputs from said output layer;
- a line searching unit for producing weight changing amounts for plural learning rates with respect to said weight changing direction;
- a weight changing unit for selecting weight changing amounts from weight changing amounts acquired by said line searching unit.
- a hidden layer product-sum storage unit for storing a product sum of input signals and weights of said hidden layer and a product sum of said input signal and said direction of changing th weight of said hidden layer; and
- a non-effective learning state detection unit or detecting that the learning has fallen into a non-effective state where further iteration does not effectively reduce an error.

11. A learning machine with multi-input single-output circuits connected in a hierarchical structure, comprising:
- a hidden layer comprising a plurality of multi-input single-output circuits which subject a weighted sum of input signals to non-linear processing by a characteristic function having a saturation characteristic in order to provide first output signals;
- an output layer comprising a plurality of multi-input single-output circuits which subject a weighted sum of said first output signals form said hidden layer to non-linear processing by a characteristic function having a saturation characteristic in order to provide second output signals;
- a supervising signal generating unit for generating supervising signals for said output layer;
- a weight changing direction decision unit for setting a weight changing direction to the steepest descent direction that minimizes errors between outputs from said supervising signal generating unit and outputs from said output layer;
- a lien searching unit for producing weight changing amounts for plural learning rates with respect to a weight changing direction; and
- a weight changing unit for selecting weight changing amounts from the weight changing amounts acquired by said line searching unit.

12. A learning machine with multi-input single-output circuits connected in a hierarchical structure according to claim 11, wherein said weight changing unit changes weights according to a weight changing amount which minimizes an error.

13. A learning machine with multi-input single-output circuits connected in a hierarchical structure according to claim 11, wherein in producing weight changing amounts for plural learning rates with respect to the weight changing direction, said lien searching unit nests, for a second iteration of the learning et seq., an initial learning rate to the larger value of a fixed value and an optimum value produced by the previous iteration of learning.

14. A learning machine with multi-input single-output circuits connected in a hierarchical structure, comprising:
- a hidden layer comprising a plurality of multi-input single-output circuits which subject a weighted sum of input signals to non-linear processing by a characteristic function having a saturation characteristic in order to provide first output signals;
- an output layer comprising a plurality of multi-input single-output circuits which subject a weighted su of said first output signals from said hidden layer to non-linear processing by a characteristic function having a saturation characteristic in order to provide record output signals;
- a supervising signal generating unit for generating supervising signals for said output layer;
- a weight changing direction decision unit for setting a weight changing direction tot eh steepest descent direction that minimizes errors between outputs from said supervising signal generating unit and outputs from said output layer;
- a line searching unit for producing weight changing amounts for plural learning rates with respect o a weight changing direction;
- a hidden layer product-sum storage unit for storing a product sum of input signal sand weights of said hidden layer and a product sum of said input signals and said direction of changing ht weight of said hidden layer; and
- a weight changing unit for selecting weight changing amounts from the weight changing amounts acquired by said line searching unit.

15. A learning machine with multi-input single-output circuits connected in a hierarchical structure, comprising:
- a hidden layer comprising a plurality of multi-input single-output circuits which subject a weighted sum of input signals to non-linear processing by a characteristic function having a saturating characteristic in order to provide first output signals;
- an output layer comprising a plurality of multi-input single-output circuits which subject a weighted sum of said first output signal form said hidden layer to non-linear processing by a characteristic function having a saturation characteristic in order to provide record output signals;
- a supervising signal generating unit for generating supervising signals for said output layer;
- a weight changing direction decision unit for setting a weight changing direction to the steepest descent direction that minimizes errors between outputs from said supervising signal generating unit and outputs from said output layer
- a line searching unit for producing weight changing amounts for plurality learning rates with respect to a weight changing direction;
- a weight changing unit for selecting weight changing amounts from the weight changing amounts acquired by said line searching unit.
- a hidden layer product-sum storage unit for storing a product sum of input signals and weights of said hidden layer and a product sum of said input signals and said direction of changing the weight of said hidden layer; and
- a non-effective learning state detecting unit for detecting that the learning is in a non-effective state where further iterations do not effectively reduce the error.

16. A learning machine with multi-in-ut single-output circuits connected in a hierarchical structure according to claim 15, wherein aid non-effective state detection unit detects a non-effective learning state by detecting that a decreasing error rate is smaller tan a predetermined value and the weight changing direction is the steepest descent direction, and initializes each weight by a random number in order to restart the learning.

17. A learning machine with multi-input single-output circuits connected in a hierarchical structure according to claim 15, wherein said non-effective state direction unit detects a non-effective learning state by detecting that a decreasing error rate is smaller tan a predetermined value and the weight changing direction is the steepest descent direction, and compresses equally all said weight sin order to restart the learning.

18. A learning machine with multi-input single-output circuits connected in a hierarchical structure, comprising:
- a hidden layer comprising a plurality of multi-input signals to non-linear processing by a characteristic function having a saturation characteristic in order to provide first output signals;
- an output layer comprising a plurality of multi-input single-output circuits which subject a weighted sum of said first output signals from said hidden layer to non-linear processing by a characteristic function having a saturation characteristic in order to provide second output signals;
- a supervising signal generating unit for generating supervising signals for said output layer;
- a weight changing reaction decision unit for selecting and deciding, from plural directions, a weight changing direction that minimizes errors between outputs from said supervising signal generation unit and said second outputs from said output layer;
- a line searching unit for producing weight changing amounts for plural learning rates with respect to a weight changing direction;
- a weight changing unit for selecting weight changing amounts acquired by said line searching unit; and
- a non-effective learning state detection unit for detecting that the learning has fallen into a non-effective state where further iteration does not effectively reduce an error.

19. A learning machine with multi-input single-output circuits connected in a hierarchical structure according to claim 18, wherein said non-effective state detection unit detects a non-effective learning state by detecting that a decreasing error rate is smaller than a predetermined value and the weight changing direction is the steepest descent direction.

20. A learning machine with multi-input single-output circuits connected in a hierarchical structure according to claim 18, wherein said non-effective state detection unit detects a non-effective learning state by detecting that a decreasing error rate is smaller than a predetermined value and the weight changing direction is the steepest descent direction, and initializes each weight by a random number in order to restart the learning.

21. A learning machine with multi-input single-output circuits connected in a hierarchical structure according to claim 18, wherein said non-effective state detection unit detects a non-effective learning state by detecting that a decreasing error rate is smaller than a predetermined value and the weight changing direction is th steepest descent direction, and compresses equally all said weights in order to restart the learning.

22. A learning machine with multi-input single-output circuits connected in a hierarchical structure according to claim 18, wherein said non-effective state defection unit detects a non-effective learning state by detecting that an absolute value of each weight is larger tan a predetermined value.

23. A learning machine with multi-input single-output circuits connected in a hierarchical structure according to claim 18, wherein said non-effective state detection unit detects a non-effective learning state by detecting that an absolute value of each weight is larger than a predetermined value and initializes each weight by a random number in order to restart the learning.

24. A learning machine with multi-input single-output circuits connected in a hierarchical structure according to claim 18, wherein said no-effective state detection unit detects a non-effective learning state by detecting that an absolute value of each weight is larger than a predetermined value and compresses equally all weights in order to restart the learning.

25. A learning machine with multi-input single-output circuits connected in a hierarchical structure according to claim 18, wherein said non-effective state detection unit detects a non-effective learning state by detecting that an absolute value of each weight is larger than a predetermine value and compresses only that weight having the largest absolute value in order to restart the learning.

26. A learning machine with multi-input single-output circuits connected in a hierarchical structure, comprising:
- a hidden layer comprising a plurality of multi-input single-output circuits which subject a weighted sum of input signals to non-linear processing by a characteristic function having a saturation characteristic in order to provide fist output signals;
- an output layer comprising a plurality of multi-input single-output circuits which subject a weighted sum of said first output signals from said hidden layer to non-linear processing by a characteristic function having a saturation characteristic in order to provide record output signals;
- a supervising signal generating unit for generating supervising signals for said output layer;
- a weight changing direction decision unit for setting a weight changing direction to the steepest descent direction that minimizes errors between outputs from said supervising signal generating unit and outputs from said output layer;
- a line searching unit for producing weight changing amounts for plural learning rates with respect to a weight changing direction;
- a weight changing unit for selecting weight changing amounts from the weight changing amounts acquired by said line searching unit; and
- a non-effective learning state detecting unit for detecting that the learning is in a non-effective state where further iterations do not effectively reduce the error.

27. A learning machine with multi-input single-output circuits connected in a hierarchical structure according to claim 26, wherein said non-effective state detection unit detects a non-effective learning state by detecting that a decreasing error rate is smaller than a predetermined value and the weight changing direction is the steepest descent direction.

28. A learning machine with multi-input single-output circuits connected in a hierarchical structure according to claim 26, wherein said non-effective state detection unit detects a none-effective learning state by detecting that an absolute value of each weight is larger than a predetermined value.

29. A learning machine with multi-input single-output circuits connected in a hierarchical structure according to claim 26, wherein said non-effective state detection unit detects a non-effective learning state by detecting that an absolute value of each weight is larger tan a predetermined value and initializes each weight by a random number in order to restart the learning.

30. A learning machine with multi-input single-output circuits connected in a hierarchical structure according to claim 26, wherein said non-effective state detection unit detects a non-effective learning state by detecting that an absolute value of each weight is layer than a predetermined value and compresses equally all weights in order to restart the learning.

31. A learning machine with multi-input single-output circuits connected in a hierarchical structure according to claim 26, wherein said non-effective state detection unit detects a non-effective learning state by detecting that an absolute value of each weight said larger than a predetermined value and compresses only that weight having the largest absolute value in order to restart the learning.

* * * * *